FIG. 6

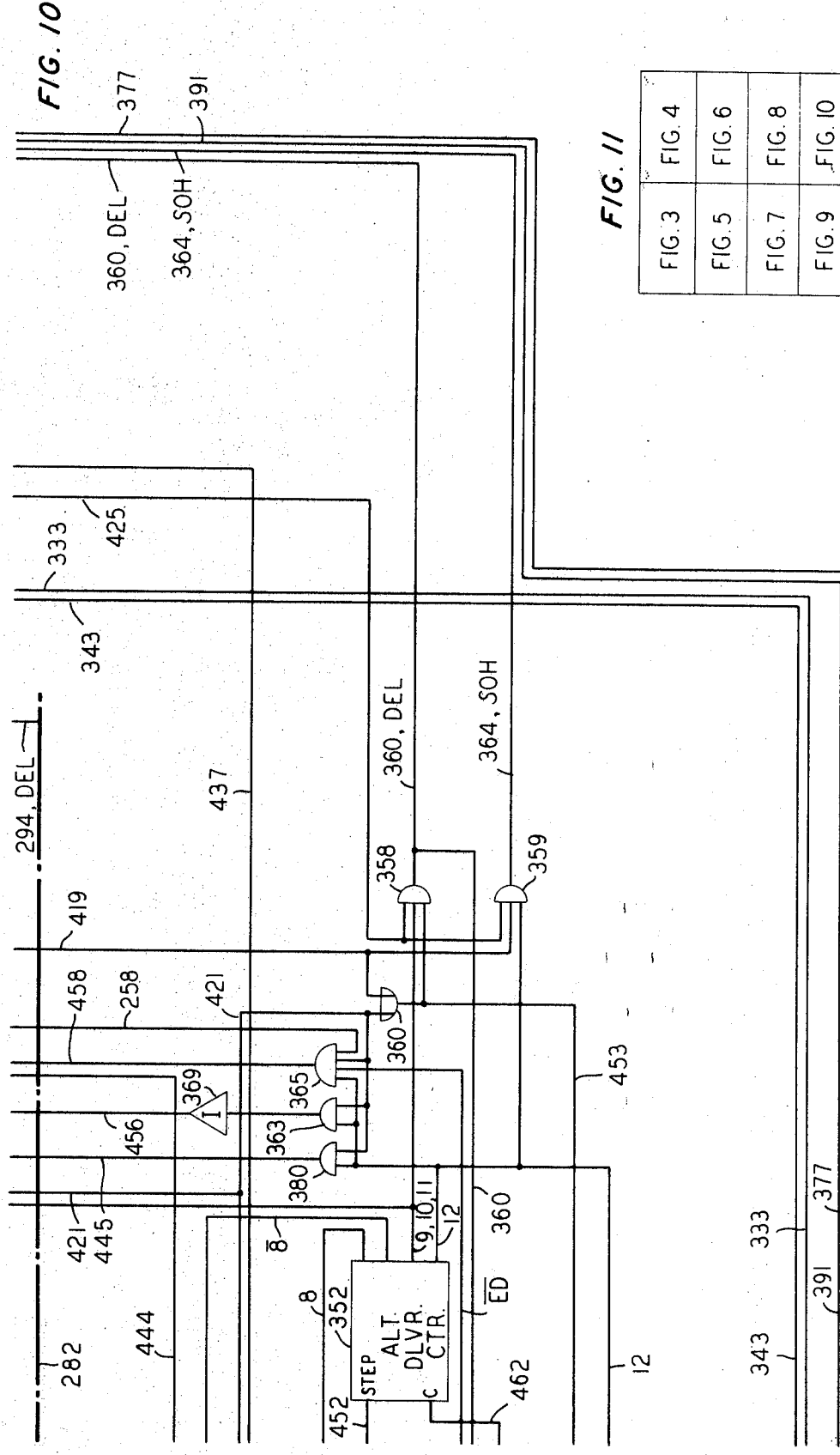

3,526,877
SELECTIVE CALLING LINE CONTROLLER FOR ALTERNATIVELY TEST POLLING REMOTE STATIONS OR STARTING REMOTE STATION TRANSMITTERS
David E. Carlson, Holmdel, Stephen A. Dalyai, Old Bridge, Alfonso V. Gallina, Freehold, Edgar R. Robinson, Middletown, Clarence J. Votaw, Elberon, and Peter S. Warwick, Middletown, N.J., assignors to Bell Telephone Laboratories, Incorporated, Murray Hill, N.J., a corporation of New York
Filed Feb. 16, 1968, Ser. No. 705,977
Int. Cl. H04q 3/42, 9/00
U.S. Cl. 340—147                                  10 Claims

ABSTRACT OF THE DISCLOSURE

A controller in a selective calling line selectively starts remote station transmitters and unblinds remote station receivers. The controller provides a polling cycle for calling station transmitters which answer back by indicating the condition of the transmitter (i.e., whether a message is available) and by starting the transmitter when it contains a message. The controller stores the address signals in the heading of the message by marking individual stages of a shift register, which, in turn, controls a binary counter to retransmit the corresponding address codes back over the multistation line sequentially and repeatedly until all addressed stations respond that they are ready to receive the message. If one or more addressee stations fail to respond, the heading with the code addresses of the stations failing to respond are sent to an intercept receiver. The addressee receivers are then unblinded to record the message text. The controller also monitors the various answer-back signals and the message heading and text. In the event that the polled station fails to respond, an improper answerback or message heading is received or a message text interruption occurs, a test poll cycle is initiated wherein the stations are polled to determine conditions thereat without starting the message transmitter. Proper responses will now restore the polling cycle.

FIELD OF INVENTION

This invention relates to multistation line data message distribution systems and, more particularly, to controllers for polling party line stations for data messages.

DESCRIPTION OF THE PRIOR ART

In data message distribution systems, it is sometimes preferable to connect groups of data stations to a common party or multistation line. In some party line systems, messages are distributed on-line, i.e., the message originates at one party line station and is destined for one or more of the other party line stations. One example of a data distribution system having on-line delivery involves a line controller which sequentially polls the data stations to determine which station transmitters have messages to send, each station responding with an answerback if there is no message to transmit or starting the station transmitter if a message is available thereat. The started station thereupon proceeds to send the message heading which contains appropriate call-in codes designating the destination stations. These call-in codes function to unblind the receivers at the destination stations to record the message text which is subsequently delivered to the line by the transmitting station.

Since the message distribution is automatic, failures or improper operations of the stations have to be detected to preclude total system breakdown. In these systems, some of the significant failures include improper manual typing of call-in codes and other supervisory codes and garbling of codes in the generation or transmission process, all resulting in the transmission of non-designated characters to the line controller. Also failure of station equipment may occur, resulting in non-response to polls or in message transmission interruption. The line controller, in response to the garbled codes or transmission interruptions, may provide improper operations or cease all operations.

In prior systems various actions are taken to preclude total system breakdown in the face of improper station operations. Code detectors are provided at the line controller to detect non-designated characters and timing circuits are provided to detect transmission interruptions. If either a non-designated character or an interruption is detected, the line controller stops all transmission and polling, restores the system and initiates a new polling cycle. A monitor may also be utilized to print the data on the line whereby a visual inspection would reveal the identity of any station having trouble. If the trouble is widespread, however, it is apparent that it is preferable to identify and clear the trouble as quickly as possible rather than continue to attempt to start transmitters.

The object of this invention is to rapidly identify trouble conditions.

SUMMARY OF THE INVENTION

This invention contemplates party line stations arranged to be polled for message material or to be test polled for answerback responses disclosing any trouble conditions at the stations. During normal polling, each station transmitter is started by the poll code individual thereto if a message is available and each station responds with an answerback if no message is available. During test polling, each station responds to the test poll code individual thereto with the answerback response disclosing any trouble conditions.

It is a feature of this invention that the line controller polls the stations for message material, starting any station with a message and, alternatively, test polls the stations for the conditions thereat, precluding the starting of the station transmitters. In accordance with this feature, the line controller goes to the test poll state, wherein the test poll codes are generated, whenever trouble conditions are detected by the line controller. If, in the test poll state, the answerback responses do not continue to indicate trouble conditions, the line controller returns to the poll state to resume normal polling. Eliminating data message distribution during the test poll state permits rapid polling of the stations for the conditions thereat.

It is a further feature of this invention that the monitor printer records the line data when the line controller goes to the test poll state. This record includes the station poll character transmitted just prior to the detection of the rouble condition, together with a character identifying the type of trouble. This gives an observer of the record a clear description of the trouble condition. Subsequent test poll characters and station conditions are also printed until the line controller no longer detects trouble conditions and is prepared to return to the normal poll state.

The foregoing and other objects and features of this invention will be fully understood from the following description of the illustrative embodiment taken in conjunction with the accompanying drawings.

BRIEF DESCRIPTION OF THE DRAWINGS

The drawing comprises FIGS. 1 through 11 wherein.

GENERAL DESCRIPTION

Figure 1:
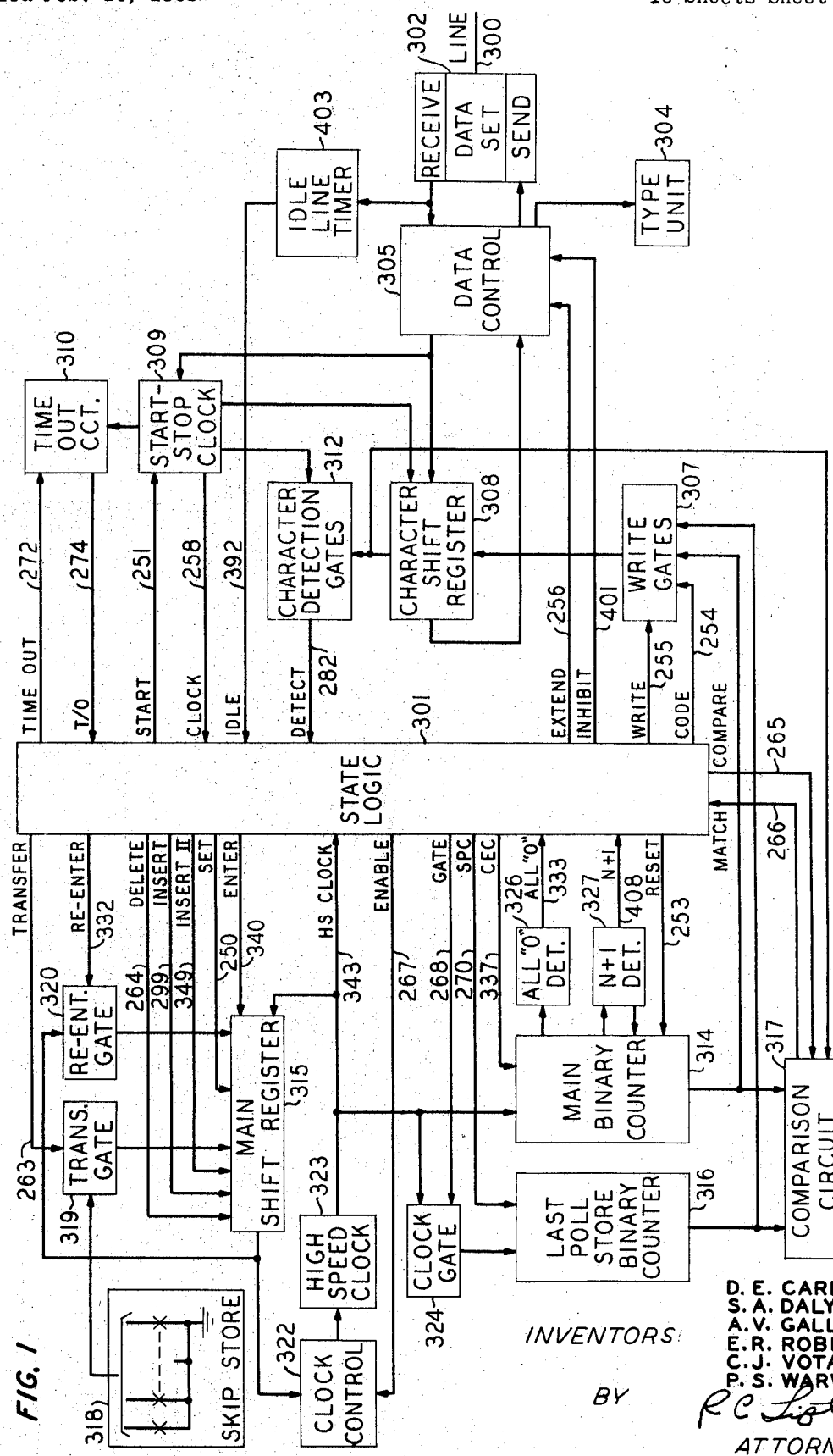
FIG. 1 discloses in block form the arrangement of the equipment of the line controller in accordance with this invention.
Figure 2:
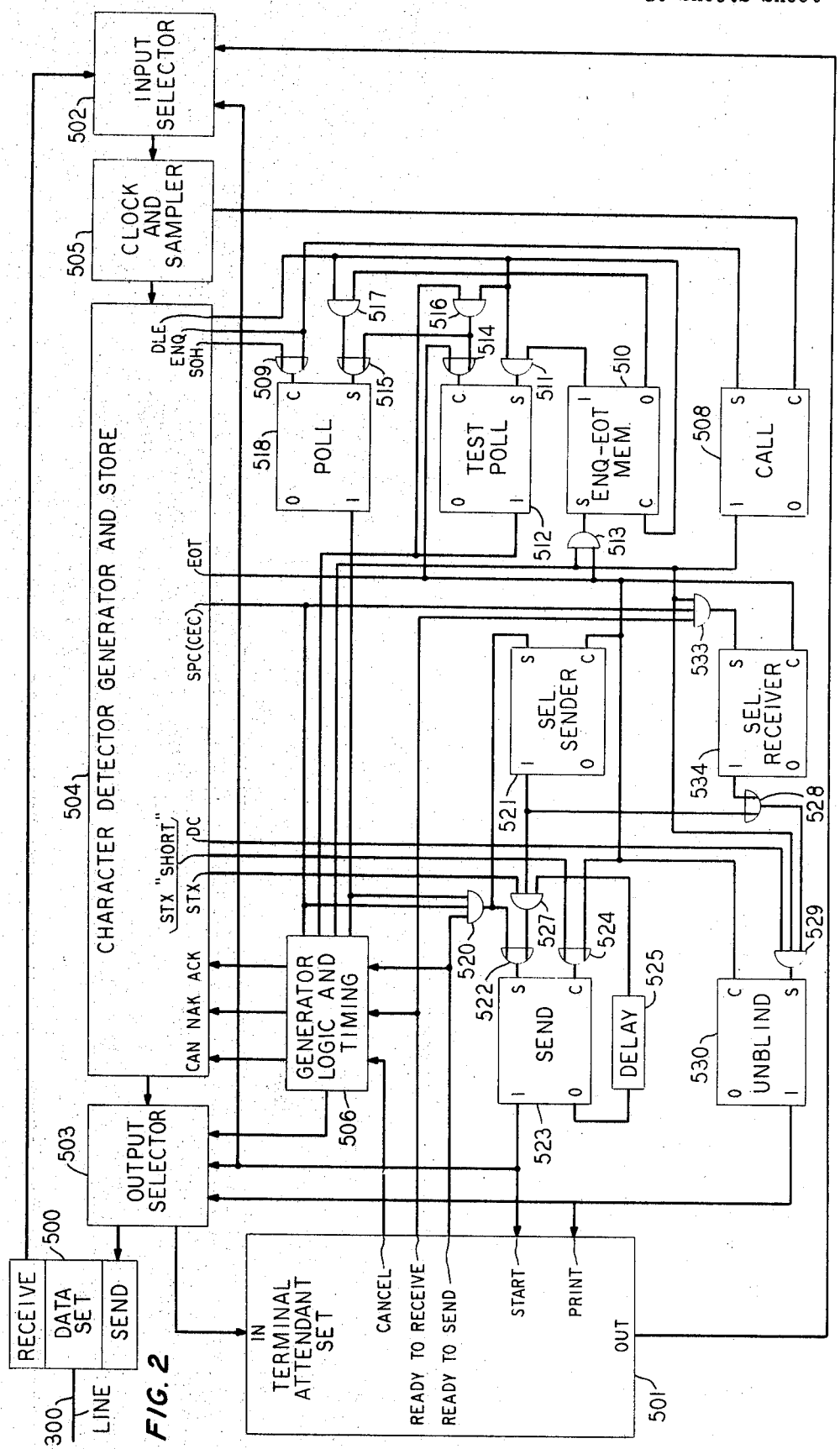
FIG. 2 shows a typical party line data station suitable for cooperation with the line controller, and FIGS. 3 through 10, when arranged as shown in FIG. 11, depict the circuits of the state logic circuit which program the operations of the equipment of the line controller.

The selective calling system of the present invention comprises a selective calling line controller shown in FIG. 1 and a plurality of substantially identical party line stations, such as the station shown in FIG. 2. These stations and the seledtive calling line controller are all interconnected by way of line 300. In general, each of the party line stations is arranged to communicate with one or more of the other stations under the control of the station line controller of FIG. 1. The controller provides supervision of the stations, testing each station to determine whether or not it is prepared to send messages and receive messages, selectively starting stations having message material to send and cutting on addressee stations in accordance with the call-in codes in the heading of the data message.

The data in each message preferably comprises American Standard Code for Information Interchange (ASCII) start-stop teletypewriter code, i.e., each data code character conventionally comprises an initial start signal element, a final two element stop signal and intermediate character elements utilizing the ASCII format. Each of the party line stations is specifically designated by a station polling code character (SPC) and a call-incode character (CEC). The SPC code and the CEC code could be the same character for the station or, alternatively, could be different characters. In any event, each character is an ASCII code character. In this arrangement, the SPC character and the CEC character are identical. Further, by inspection of the ASCII format it could be seen that each code character corresponds to a binary number. Accordingly, it may be said that each of the partly line stations corresponds to a binary number. This correspondence is specifically utilized by the main station line controller, as disclosed hereinafter.

MAIN STATION LINE CONTROLLER

Refer now to FIG. 1, showing the main station line controller. The controller is arranged to provide a sequence of functions which is determined by the circuits in the controller and is further determined by responses of the several party line stations to various code characters and character sequences applied to line 300 by the main station line controller. The state logic, generally indicated by block 301, provides the program for the controller which program defines the various steps and various operational sequences of the station line controller. The operation of state logic 301 is generally described here and the details of the circuits of state logic 301 are described in a subsequent detailed description.

The line controller also includes a main shift register, generally indicated by block 315. This shift register contains a plurality of stages, including an initial stage for control purposes, a final stage for entering certain bits and intermediate stages. Each of the intermediate stages corresponds to an individual one of the party line stations when main shift register 315 is in its initial state. With the main shift register in its initial condition, the first stage provides a control function, the next subsequent stage corresponds to the party line station whose SPC and CEC codes correspond to the first binary number and each successive stage thereto corresponds to the party line station designated by the subsequent binary number.

Main shift register 315 is arranged for serial and parallel inputting. One source of parallel inputting is provided by skip store 318 by way of transfer gate 319. Skip store 318 includes a plurality of memory elements. These memory elements are shown in FIG. 1 as mechanical contacts which extend a potential to a plurality of output leads. The specific type of memory elements in skip store 318 can, of course, be any other storage device so long as appropriate ones of the output leads have potentials applied to them. The purpose of skip store 318 is to provide an indication as to which of the outlying stations are to be polled for message material and, conversely, which stations are to be skipped. Those stations which are to be polled are designated by energizing their corresponding output leads, thus forming a skip table. Operation of the storage devices may be accomplished in any well known manner.

Transfer gate 319 functions to pass the skip table to main shift register 315 when an activating pulse is sent to TRANSFER lead 263 by state logic 301. Specifically, when TRANSFER lead 263 is pulsed, the skip table is passed from skip store 318 to main shift register 315 by transfer gate 319, which inserts bits in each stage of register 315 corresponding to each party line station to be polled for message material.

State logic 301 also inserts bits ("1" bits) in main shift register 315 by way of INSERT lead 299, INSERT II lead 349 and ENTER lead 340. Specifically, the pulsing of lead 299 inserts a bit in the first stage of register 315, the pulsing of lead 349 inserts a bit in the second stage of register 315 and the pulsing of lead 340 may insert a bit in the final stage of register 315. Conversely, the pulsing of DELETE lead 264 removes any bit that might be stored in the first stage of main shift register 315. (This is accomplished by inserting a "0" bit in the first stage.) State logic 301 can also reset main shift register 315 by pulsing SET lead 250. The pulsing of lead 250 functions to insert a bit in the first stage and delete the bits in all the other stages of main shift register 315. Finally, bits can be applied to the $n$th or last intermediate stage of main-shift register 315 by way of re-entry gate 320. Specifically, state logic 301 may energize RE-ENTER lead 332, enabling re-entry gate 320 to recirculate bits from the first stage of main shift register 315 back through gate 320 to the $n$th stage of the register.

The shifting of the bits in main shift register 315 is affected by shift pulses derived from high speed clock 323. High speed clock 323 is arranged to develop clock pulses when enabled by clock control 322. Clock control 322, in turn, enables high speed clock 323 when either the first stage of main shift register 315 does not contain a bit or ENABLE lead 267 is energized by state logic 301. Thereafter, clock control 322 maintains high speed clock 323 enabled until ENABLE lead 267 is de-energized and a bit is advanced to the first stage of register 315.

The output of high speed clock 323 is also passed to state logic 301 by way of high speed CLOCK lead 343, to the input of main binary counter 314 and to the input of last poll store binary counter 316 by way of clock gate 324. It is noted that clock gate 324 is enabled to pass the clock pulses when an energizing signal is applied by state logic 301 to GATE lead 268.

Main binary counter 314 and last poll store binary counter 316 are arranged to provide a binary count, which count may be advanced to a maximum number equal to the number of stages in main shift register 315. Accordingly, each binary count corresponds to the number of each party line station with the first binary number (0) corresponding to the one supervisory stage in register 315.

Referring to main binary counter 314, when the count advances to the number of the last station plus one ($n+1$), $n+1$ detector 327 is operated to pulse $n+1$ lead 408 which extends to state logic 301. In addition, detector 327 resets main binary counter 314. Thereupon, with counter 314 reset to the initial count, all-"0" detector 326 operates to pulse ALL "0" lead 333. It is noted that last poll store binary counter 316 resets in the same manner as main binary counter 314 although the corresponding $n+1$ detector is not shown.

The line controller is also provided with character shift register 308. Register 308 has a plurality of register stages corresponding to each element in the start-stop code characters. Code characters may be applied in parallel to character shift register 308 by write gates 307. Specifically, state logic 301 may code individual characters on write gates 307 by way of CODE leads 254 (lead 254 comprising a cable for a plurality of coding leads). Alternatively, the binary number output of last poll store counter 316 or main binary counter 314 is applied to write gates 307 when state logic 301 energizes SPC lead 270 or CEC lead 337, respectively. In any event, the particular code applied to write gates 307 is gated in parallel to register 308 when state logic 301 pulses WRITE lead 255.

The parallel outputs of character shift register 308 are applied to character detection gates 312 and may also be applied to comparison circiut 317, as described hereinafter. Character detection gates 312, when enabled by start-stop clock 309, pulse DETECT leads 282 in accordance with the character in register 308. DETECT leads 282 comprise a cable for a plurality of leads, each corresponding to a code character of interest to state logic 301. Accordingly, in accordance with the character in register 308, a particular one of DETECT leads 282 is pulsed and this pulse is passed to state logic 301. Serial inputting to character shift register 308 is provided by data control 305. Incoming data codes from line 300 are received by the receive portion of data set 302. Data set 302 converts the line signals to the appropriate start-stop code data signals which are passed to data control 305 and to idle line timer 403.

Consider for a moment idle line timer 403. This timer is arranged to time out when the incoming line is idle for a predetermined interval of time, i.e., when no signals are received. Thereupon IDLE lead 392, which extends to state logic 301, is pulsed.

Returning now to data control 305, when state logic 301 energizes INHIBIT lead 401, data control 305 blocks the passage of the data signals from data set 302. Normally, however, data control 305 passes the signals from the receive portion of data set 302 to the first stage of character shift register 308, and to start-stop clock 309. Thus, when a start signal is received, start-stop clock 309 starts up, applies shift pulses to character shift register 308 to insert the character therein and, after the character is thus inserted, pulses character detection gates 312 to permit the gates to provide its detection process. In addition, start-stop clock 309 may be started up by a pulse on START lead 251 from state logic 301. In this event, clock 309 provides the usual shift pulses to character shift register 308 and, at the termination of a start-stop cycle, pulses CLOCK lead 258. Finally, when start-stop clock 309 is started up, time out circuit 310 is pulsed. In the event that time out circuit 310 has been started by a pulse applied to TIME OUT lead 272 by state logic 301, the pulse from clock 309 resets time out circuit 310. In the event, however, that the time out circuit 310 is not reset and thus times out, a pulse is applied to state logic 301 by way of T/O lead 274.

Data control 305 is also arranged to pass serial output data from character shift register 308 to data set 302 or to typing unit 304. Specifically, in accordance with the manner that state logic 301 energizes EXTEND leads 256, data control 305 may pass the data characters from register 308 to the send portion of data set 302 which, in turn, converts the characters to appropriate line signals for application to line 300. Data control 305 alternatively passes the signal from output register 308 to typing unit 304, when EXTEND leads 256 are energized in another manner, whereby the characters will be printed to provide, as described hereinafter, various diagnostic printouts.

As previously noted, the line controller also includes comparison circuit 317. This circuit is arranged by state logic 301 by way of COMPARE lead 265 to provide one of two alternate functions. The first function is to compare the binary count output of counter 316 with the output of counter 314. The second function is to compare the output of binary counter 314 with the parallel output of character shift register 308. In either event, when the comparison indicates that a match is attained, comparison circuit 317 pulses MATCH lead 266, which lead extends to state logic 301.

MAIN STATION LINE CONTROLLER—GENERAL OPERATION

The main station line controller is placed in its initial condition by the manual operation of a key in state logic 301, which key is not shown in FIG. 1 but is disclosed hereinafter with respect to the detailed description of state logic 301. The operation of the initializing key operates state logic 301 to place the circuit in the initializing state. In this state, state logic 301 operates to pulse SET lead 250, whereby a bit is entered in the first stage of main shift register 315. Concurrently, RESET lead 253 is pulse to reset main binary counter 314. Accordingly, main shift register 315 is placed in its initial condition and main binary counter 314 is reset to its initial count.

At this time state logic 301 enables CODE leads 254 to code the enquiry character "ENQ" on write gates 307. WRITE lead 255 is also pulsed, passing the code "ENQ" to character shift register 308. In addition, EXTEND leads 256 are energized in a manner to enable data control 305 to extend the serial output of shift register 308 to data set 302. Finally, in the initializing state, state logic 301 pulses START lead 251, thus activating the operation of start-stop clock 309 which, in turn, applies shift pulses to register 308. Accordingly, the code character "ENQ" is shifted out of shift register 308, passed by way of data control 305 to the send portion of data set 302 and thus converted to line signals for application to line 300.

At the termination of the transmission of code character "ENQ," the operation of start-stop clock 309 terminates, whereby CLOCK lead 258 is pulsed. State logic 301 in response thereto codes the end-of-transmission character "EOT" on write gates 307 by way of CODE leads 254. WRITE lead 255 is also pulsed to enable write gates 307 to pass the code character to register 308. In addition, state logic 301 enables data control 305 to again extend the output of shift register 308 to data set 302. Finally, START lead 251 is again pulsed, start-stop clock 309 again initiates its operation and the code character "EOT" is thus passed on to line 300. Accordingly, the code sequence "ENQ-EOT" is transmitted to the party line stations. As described hereinafter, this code sequence has the effect of clearing the party line stations, which are then prepared to be test polled.

After the code character "EOT" is transmitted, start-stop clock 309 pulses CLOCK lead 258, stepping state logic 301 to the initializing test poll state. In this state, state logic 301 steps start-stop clock 309 through two cycles. All of the other functions are suppressed, however, in this state, for reasons more fully set forth in the detailed description of the state logic circuit.

At the end of the second cycle of start-stop clock 309 a pulse is again returned on CLOCK lead 258. At this time state logic 301 pulses TRANSFER lead 263. This enables transfer gate 319 to pass the skip table in skip store 318 to main shift register 315. State logic 301 now enables comparison circuit 317 by way of COMPARE leads 265 to compare the outputs of main binary counter 314 with the output of last poll store binary counter 316. If comparison circuit 317 indicates by way of MATCH lead 266 that the outputs are not identical, state logic 301 energizes ENABLE lead 267. Accordingly, high speed clock 323 is enabled to concurrently advance main shift register 315 and main binary counter 314. This advance continues until a comparison is reached between counters 314 and 316, at which time comparison circuit 317 returns a match signal on lead 266 to state logic 301. Thus, counter 314 and register 315 are advanced to coincide with the position of counter 316. It is noted, however, that in the initialized state, counter 316 can be considered to be normally at the initial position. Thus, main binary counter 314 is matched with counter 316 and state logic 301 does not energize ENABLE lead 267 since a match is initially obtained.

Upon the attaining of the match, state logic 301 energizes GATE lead 268 to connect the output of high speed clock 323 to last poll store binary counter 316. At the same time, DELETE lead 264 is pulsed, removing the bit in the first stage of register 315, enabling clock control 322 to maintain high speed clock 323 operating. Thus, counters 314 and 316, which are now matched with each other and with register 315, are concurrently advanced with register 315 until the next bit advances to the first stage of main shift register 315. This bit corresponds to the bit from the skip table, which designates a station to be polled. (This is the first station on the skip table when state logic 301 is in the initialized test poll state wherein the counters are in the initial position.) The appearance of the bit in the first stage stops clock 323 by way of clock control 322. Accordingly, main binary counter 314 and last poll store binary counter 316 are advanced to a count corresponding to the binary number of the outlying station to be polled.

In the initializing test poll state, state logic 301 also codes the character "DLE" on write gates 307 and pulses WRITE lead 255 to pass the code character "DLE" to shift register 308. Data control 305 is also enabled to extend the output of register 308 to data set 302. Finally, state logic 301 starts up start-stop clock 309, whereby the code character "DLE" is passed to line 300.

After the transmission of code character "DLE," start-stop clock 309 pulses state logic 301. In the initializing test poll state, state logic 301 energizes SPC lead 270, whereupon the station poll character or binary number of the first station to be polled is coded on write gates 307 by the last poll store binary counter 316. State logic 301 also pulses WRITE lead 255 to pass the station poll character to shift register 308. Data control 305 is also enabled to extend the output of shift register 308 to data set 302 and start-stop clock 309 is enabled, whereby the station poll code is transmitted to line 300. At this time state logic 301 pulses TIME out lead 272, enabling time out circuit 310 to start its time out operation.

Summarizing the above sequence of operations, it is seen that after the code sequence "ENQ-EOT" is sent to the line during the initializing state, state logic 301 enables the controller circuit to advance counters 314 and 316 together with register 315 to the position corresponding to the first station to be polled and arranges the generation of the code sequence "DLE-SPC" (the code character "SPC" corresponding to the station poll code of the first outlying station). As described hereinafter, the outlying stations view the code character "DLE" following the code sequence "ENQ-EOT" as the start of the test poll. Each station then responds to its own station poll code. The response will be the code character "ACK" if a message is available, the code character "NAK" if no message is available, or the code character "CAN" if a previous message was improperly received.

Assume now that the polled outlying station does not respond to the station poll code. In this event, after a predetermined interval of time, time out circuit 310 operates to pulse T/O lead 274. In response thereto state logic 301 codes write gates 307 with the character "T," enables write gates 307 to pass the code character to shift register 308, enables data control 305 to extend the serial output of shift register 308 to typing unit 304 and starts start-stop clock 309. Thus, the code character is printed by typing unit 304.

At the termination of this printing, start-stop clock 309 pulses CLOCK lead 258. Thereupon, state logic 301 poll store binary counter 316. Write gates 307 are also enabled to pass the code character to shift register 308 cores write gates 307 with the station poll code from last and data control 305 extends the output of shift register 308 to typing unit 304. Finally, start-stop clock 309 is operated by way of START lead 251. Thus, the station poll code is printed by typing unit 304. Accordingly, a diagnostic printout is made indicating that a time out has occurred and identifying the outlying station which has not responded to the polling.

At the termination of the diagnostic printout start-stop clock 309 pulses CLOCK lead 258. State logic 301 then deletes the bit in the first stage of main shift register 315. This enables high speed clock 323 to advance counters 314 and 316 together with register 315 until the next bit in the skip table advances to the first stage of main shift register 315. High speed clock 323 thereupo stops and the station poll code of the next outlying station is generated and transmitted to line 300 in the same manner as previously described.

Summarizing the operations that occur when the outlying station fails to respond, time out circuit 310 times out, pulsing state logic 301. In the initializing test poll state, state logic 301 arranges a diagnostic printout indicating that time out has occurred, together with a printing of the station poll code. After the printout, counters 314 and 316, together with register 315, are advanced to the position corresponding to the next station to be polled and its poll code is thereupon generated and transmitted to line 300.

Assume now that the polled outlying station responds with a garbled or non-designated character (i.e., a code character not "ACK," "NAK" or "CAN"). In this event the code character is received from line 300 by data set 302 and passed by way of data control 305 to character register 308. At the same time the start pulse of the character enables start-stop clock 309 to shift the code elements into register 308 and, at the same time, to reset time out circuit 310.

When the grabled or non-designated character is fully received, start-stop clock 309 pulses character detection gates 312, enabling the gates to pass by way of DETECT lead 282 an indication that a non-designated character has been received. In response thereto state logic 301 codes write gates 307 with the "bad response" character "R," enables write gates 307 to pass the character to shift register 308, enables data control 305 to extend the output of register 308 to typing unit 304 and starts start-stop clock 309. Thus, the code character "R" is printed by typing unit 304.

At the termination of this printing, start-stop clock 309 pulses CLOCK lead 258. Thereupon, state logic 301 energizes SPC lead 270, thus coding write gates 307 with the station poll code from last poll store binary counter 316. Write gates 307 are also enabled, as is data control 305, to permit typing unit 304 to print the station poll code in the same manner as previously described with respect to the time out printout. Accordingly, a diagnostic printout is made, indicating that a garbled or non-designated character has been received and identifying the outlying station which has made this non-designated response.

At the termination of the diagnostic printout, start-stop clock 309 pulses CLOCK lead 258. State logic 301 then proceeds to delete the bit in the first stage of main shift register 315. This enables high speed clock 323 to advance counters 314 and 316 together with register 315 to the next station to be polled, whereby the station poll code of the next outlying station is generated and transmitted to line 300 in the same manner as previously described.

Summarizing the operations that occur when the outlying station returns a garbled or non-designated character, detection gates 312 indicate to state logic 301 the non-designated response. State logic 301 thereupon arranges a diagnostic printout indicating that a non-designated response has been received, together with a printing of the station poll code. After the printout, counters 314 and 316, together with register 315, are advanced to the position corresponding to the next station to be polled and its poll code is thereupon generated and transmitted to line 300.

Assuming now that the polled outlying station responds with the cancel character "CAN." Upon the reception of the character by data set 302, start-stop clock 309 is operated to reset time out circuit 310 and shift the character into shift register 308, as previously described. Detection gates 312 then indicate to state logic 301 that the code character "CAN" has been received. In response thereto, state logic 301 codes write gates 307 with the character "C," energizes write gates 307 together with data control 305, and starts start-stop clock 309. Thus, the character "C" is printed by typing unit 304 in the same manner as previously described.

At the termination of this printing, start-stop clock 309 pulses CLOCK lead 258. Thereupon, state logic 301 energizes SPC lead 270, thus coding write gates 307 with the station poll code from last poll store binary counter 316. State logic 301 also pulses write gates 307 to pass the code character to shift register 308, data control 305 is energized and start-stop clock 309 is operated to permit the printing of the station poll code by typing unit 304. Accordingly, a diagnostic printout is made, indicating that the polled station has responded that the previous message was improperly received and identifying the outlying station which has so responded.

At the termination of the diagnostic printout start-stop clock 309 pulses CLOCK lead 258. State logic 301 thereupon deletes the bit in the first stage of main shift register 315 to advance counters 314 and 316, together with main shift register 315, to the next station to be polled. At this time state logic 301 advances to the poll state.

Summarizing the operations that occur, when the outlying station responds with the code character "CAN," the code character is received by shift register 308 and character detection gates 312 pulse state logic 301 to indicate the reception of this particular character. State logic 301, in turn, arranges a diagnostic printout indicating that the outlying station has responded that the previous message was received improperly together with a printing of the station poll code. After the printout counters 314 and 316, together with register 315, are advanced to the position corresponding to the next station to be polled. State logic 301 at that time steps to the poll state.

Assuming now that the outlying station in response to the test poll returns the code character "NAK" to indicate that the station has no message available. Upon the reception of the code character, start-stop clock 309 resets time out circuit 310 and shifts the code character into register 308. Character detection gates 312 thereupon pulse state logic 301 to indicate that the outlying station has returned a designated response but does not have message material to transmit. Thereupon, state logic 301 deletes the bit in the first stage of main shift register 315 to advance counters 314 and 316, together with register 315, to the next station to be polled. State logic 301 thereupon steps to the poll state.

If the outlying station responds to the test poll with the code character "ACK," indicating that a message is available, time out circuit 310 is reset, as previously described, and the character is shifted into shift register 308 by start-stop clock 309. Character detection gates 312 thereupon indicate to state logic 301 that a station has responded that a message is available. State logic 301, in response thereto, steps to the poll state. It is noted that state logic 301 does not advance counters 314 and 316. Accordingly, the counters are maintained on the position corresponding to the station responding to the test poll with the character "ACK."

When state logic 301 steps to the poll state, CODE leads 254 are energized in a manner to code the character "DLE" on write gates 307. State logic 301 also enables write gates 307 to pass the character to shift register 308, enables start-stop clock 309 to produce shift pulses, whereby shift register 308 serially shifts out the code character, and, finally, energizes EXTEND leads 256 in a manner to enable data control 305 to extend the output of shift register 308 to data set 302. Accordingly, the code character "DLE" is passed to line 300.

At the termination of the transmission of the character "DLE," start-stop clock 309 pulses state logic 301 by way of CLOCK lead 258. State logic 301, in turn, pulses SPC lead 270, whereby the binary output code from last poll store binary counter 316 is applied to write gates 307. State logic 301 again pulses WRITE lead 255 and START lead 251, whereby the station poll character is passed to shift register 308 and serially shifted out to data control 305. In addition, state logic 301 again enables data control 305 to extend the output of shift register 308 to data set 302, thus passing the station poll code to line 300. Finally, state logic 301 pulses TIME OUT lead 272, thereby initiating the operation of time out circuit 310.

Summarizing the above sequence of operations, it is seen that when state logic 301 steps to the poll state it arranges the generation of the code sequence "DLE-SPC." As described hereinafter, the outlying stations view the code character "DLE" when not following the code sequence "ENQ-EOT" as the start of a normal poll and not as a test poll. Each station then responds to its own station poll code. This response will be the code character "CAN" if the previous message was improperly received, the code character "NAK" if no message is available and the start-of-heading character "SOH," which may or may not be preceded by "Delete" characters, if a message is available, The reception of the start-of-heading character "SOH" or the "Delete" character indicates the station is proceeding to send the heading of the message.

Assume now that the polled station fails to respond to the station poll code. In this event, after a predetermined interval of time, time out circuit 310 operates to pulse T/O lead 274. In response thereto state logic 301 goes to the major alarm state. In this condition state logic 301 functions in substantially the same manner as in the initializing state, wherein, as previously described, main binary counter 314 is reset and main shift register 315 is cleared with a bit entered in the first stage. In addition, the code sequence "ENQ-EOT" is generated and transmitted to line 300. It is noted at this time that last poll store binary counter 316 remains at the position corresponding to the station which has failed to respond. The code sequence "ENQ-EOT" clears the party line stations, placing them in a condition to respond to a test poll.

Returning now to the line controller, start-stop clock 309 pulses state logic 301 when the transmission of the code sequence "ENQ-EOT" is concluded. State logic 301 in response thereto advances to the test poll state. In this condition state logic 301 operates in a manner similar to the initializing test poll state, wherein a diagnostic printout is provided, which, in this case, is the code sequence "T-SPC." (The "SPC" corresponds to the station which fails to respond since counter 316 has been maintained on the corresponding position.) After the printout the skip table is again entered in main shift register 315 and counter 314 is stepped with main shift register 315 until a match is obtained between counters 314 and 316. The bit is deleted from the first stage of main shift register 315 at this time whereupon counters 314 and 316, together with main shift register 315, are stepped to the next station to be polled and the code sequence "DLE-SPC" is transmitted. State logic 301 thereafter remains in the test poll state until a proper response is returned by a polled station. Thus, as previously described with respect to the initializing test poll state, each station is polled, diagnostic printouts are provided if the proper response is not received, and, if a proper response is received, state logic 301 advances again to the poll state.

Return now to the advancing of state logic 301 to the poll state and the polling of the outlying station. Assume that the polled station responds with a garbled character, i.e., that the response does not comprise any one of the characters "SOH," "NAK," "CAN" or "Delete." When the start element of the non-designated character is received by data set 302 and passed to register 308, start-stop clock 309 is enabled, resetting time out circuit 310 and shifting the character into register 308. At the termination of the reception of the character, detection gates 312 pulse state logic 301 to indicate that a nondesignated character has been received. In response thereto, state logic 301 goes to the major alarm state. In this condition, as previously described, state logic 301 resets binary counter 314, clears main shift register 315 and generates the code sequence "ENQ-EOT" for transmission to line 300. The party line stations are thus cleared, placing them in condition to respond to the test poll. Thereafter, state logic 301 advances to the test poll state and provides a diagnostic printout of the code sequence "R-SPC" wherein the code character "SPC" corresponds to the station which had responded with the garbled character. After the printout the skip table is again registered in main shift register 315, a match is obtained between counters 314 and 316 and the counters, with shift register 315, are stepped to the next station to be polled in the same manner as previously described. The code sequence "DLE-SPC" is then transmitted to test poll the next station and the previously described test poll program is again provided.

Returning again to the poll state wherein the line controller polls the outlying station, assume now that the polled station responds with the code character "CAN." In this event, start-stop clock 309 resets time out circuit 310 and shifts the code character into shift register 308. After the character is received, detection gates 312 pulse state logic 301. State logic 301, in response to the detection of the code character "CAN," codes write gates 307 with the printout code character "C," pulses the write gates to pass the character to shift register 308, enables start-stop clock 309 and energizes EXTEND leads 256 in a manner to enable data control 305 to extend the output of shift register 308 to typing unit 304. Thus, the character "C" is printed by typing unit 304.

After the printing of the character "C," start-stop clock 309 pulses state logic 301. State logic 301, in turn, pulses SPC lead 270, enabling last poll store binary counter 316 to code write gates 307 with the station poll code of the outlying station which responded with the code character "CAN." State logic 301 also pulses WRITE leads 255, EXTEND leads 256 and START lead 251, whereby the station poll code is passed through write gates 307 to shift register 308 and then to typing unit 304. Thus, a diagnostic printout is provided, indicating that the polled station has responded that the previous message was improperly received.

After the printout of the code sequence "C-SPC," state logic 301 deletes the first bit in main shift register 315. This enables high speed clock 323 to concurrently advance counters 314 and 316, together with main shift register 315, until the next station to be polled is reached. At this time state logic 301 pulses SPC lead 270, coding the station poll code of this next station on write gates 307. State logic 301 also enables write gates 307 to pass the station poll character to register 308 and then, by way of data control 305, to data set 302. Accordingly, the station poll code is transmitted to line 300. Since the outlying stations are presently looking for poll codes, the polled station responds to its code in the same manner as previously described.

Assume now that, with state logic 301 in the poll state, a station responds with the character "NAK," indicating that no message is available thereat. Upon the reception of the character, start-stop clock 309 resets time out circuit 310 and shifts the character into register 308. After the character is received, detection gates 312 pulse state logic 301. In response thereto state logic 301 deletes the bit in the first stage of main shift register 315, whereby high speed clock 323 advances counters 314 and 316, together with register 315, to the next station to be polled. State logic 301 thereupon pulses SPC lead 270, whereby, as previously described, the station poll code of the next station is generated and passed to line 300. At the same time TIME OUT lead 272 is pulsed to reinitiate the operation of time out circuit 310. Accordingly, the next station poll code is transmitted and the line controller awaits the response, in the same manner as previously described.

If the polled outlying station has a message available it responds to the poll code by sending the message heading. The start-of-message character "SOH" designates the first character of the message heading. This character, however, may be preceded by "Delete" or "fill" characters in the message tape.

Assume first that a "Delete" character is received from the polled station. Upon the reception of the character, start-stop clock 309 resets time out circuit 310 and shifts the character into register 308. Detection gates 312 thereupon pulse state logic 301 and the logic circuit advances to the wait-for-heading state. In this state, TIME OUT lead 272 is pulsed to enable time out circuit 310 to again operate. For each subsequent "Delete" character start-stop clock 309 again resets time out circuit 310 and state logic 301 thereafter restarts time out circuit 310. In this manner the several "Delete" characters are received and the state logic awaits the start-of-heading character "SOH."

If during the wait-for-heading state the outlying station ceases to transmit, time out circuit 310 times out and pulses state logic 301. This advances state logic 301 back to the poll state. Upon advancing to the poll state, state logic 301 deletes the bit in the first stage of main shift register 315 to advance counters 314 and 316, together with register 315, to the position corresponding to the next station to be polled. Thereupon, state logic 301 arranges the generation of the code character sequence "DLE-SPC" (character "SPC" comprising the station poll character of the next station). Accordingly, station polling is resumed and the station poll character of the next station to be polled is transmitted to line 300.

Return now to the line controller in the wait-for-heading state. If the outlying station responds with a garbled or non-designated character, i.e., with a character other than "Delete" or "SOH," start-stop clock 309 is enabled, as previously described, to reset time out circuit 310 and shift the garbled character into register 308. Detection gates 312 then pulse state logic 301, indicating that a garbled character has been received. State logic 301 thereupon advances to the major alarm state.

In the major alarm state, as previously described, state logic 301 resets main binary counter 314, clears main shift register 315 and generates and transmits the code sequence "ENQ-EOT" to clear the party line stations. After this major alarm code sequence is generated state logic 301 advances to the test poll state wherein a diagnostic printout is provided. In this case the printout includes the bad heading character "H" followed by the station poll code of the party line station which responded with the non-designated character.

At this time counter 314 and register 315 advance until a match is achieved with counter 316. The bit is deleted in the first stage of main shift register 315 and the circuits again advance to the next station to be pulled. The code sequence "DLE-SPC" is now generated and transmitted, as previously described, whereby the test poll of the next station is provided. Test polling will then continue until a proper response is received.

It is recalled that while state logic 301 is in the poll state or in the wait-for-heading state, the outlying station may return the start-of-heading character "SOH." In either event the reception of the character "SOH" operates start-stop clock 309 to reset time out circuit 310 and shift the character into register 308. Detection gates 312 then pulse state logic 301 to indicate that the start-of-heading character has been received. State logic 301, in turn, advances to the heading reception state.

In the heading reception state, state logic 301 energizes COMPARE leads 265 in a manner to arrange comparison circuit 317 to compare the output of main binary counter 314 with the output of character shift register 308. In addition, state logic 301 clears main shift register 315, writing a bit in the first stage of the register and clearing the other stages. State logic 301 also resets main binary counter 314 and restarts time out circuit 310. In addition, state logic 301 energizes RE-ENTER lead 322, whereby re-entrant gate 320 is enabled to recirculate bits from the first stage of the main shift register 315 to the $n$th stage. In this heading reception state the line controller is prepared to receive the message heading from the sending station and register the address codes in the message heading.

When an address character is received, time out circuit 310 is reset and the call-in or address code is entered in character shift register 308. At the conclusion of the reception of the address code, start-stop clock 309 pulses state logic 301. Thereupon, state logic 301 restarts time out circuit 310 and energizes ENABLE lead 267. This starts up high speed clock 323, concurrently advancing main binary counter 314 and main shift register 315. When main binary counter 314 advances to a count corresponding to the binary number individual to the call-in code, a match is achieved between the output of main binary counter 314 and the output of character shift register 308. Comparison circuit 317 thereupon returns a pulse on MATCH lead 266. State logic 301 then pulses INSERT lead 299, whereby a bit is inserted in the first stage of shift register 315. Since shift register 315 has advanced to a position where the first stage corresponds to the addressee station, a bit is thus inserted in this stage to indicate that the station is designated as an addressee station. Couner 314 and shift register 315 continue to advance and the bit in the first stage is recycled through re-entrant gate 320 to the $n$th stage of register 315.

When main binary counter 314 advances to its maximum cycle count, $n+1$ detector 327 is pulsed. This resets main binary counter 314 and pulses state logic 301 by way of $n+1$ lead 408. State logic 301 now removes the energizing condition applied to ENABLE lead 267, stopping high speed clock 323 which, in turn, stops counter 314 and register 315 in their initial positions. The line controller now awaits the reception of the next call-in code, whereupon the process is repeated.

If, during the heading reception state, the party line sending station should be interrupted, time out circuit 310 times out and pulses state logic 301. State logic 301 thereupon goes to the major alarm state wherein the code sequence "ENQ-EOT" is generated and transmitted, clearing and restoring the party line station. Thereafter, a diagnostic printout of the character sequence "T-SPC" is provided and a new test poll is initiated in the same manner as previously described.

If during the heading reception state, the sending station responds with an improper code which is neither a "Delete" character, a call-in ("CEC") character nor a start-of-text ("STX") character, this is detected by character detection gate 312 which, in turn, pulses state logic 301, indicating an improper code. In this event, state logic 301 similarly advances to the major alarm state, sending the code sequence "ENQ-EOT," providing the diagnostic printout of the characters "H-SPC" wherein the character "H" indicates a bad heading character. State logic 301 then proceeds to the test poll state in the same manner as previously described.

Return now to the reception of the message heading during the heading reception state. The heading is terminated by the start-of-text ("STX") character. When this character is received, start-stop clock 309 resets time out circuit 310 and shifts the character into register 308. Detection gates 312 then pulse state logic 301 to indicate the reception of the code character "STX." State logic 301 thereupon enters the heading delivery state.

In the heading delivery state, state logic 301 energizes SPC lead 270, pulses WRITE lead 255 and START lead 251, and energizes EXTEND lead 256 in a manner to extend the output of register 308 to typing unit 304. Accordingly, as previously described, the station poll code of the outlying station originating the message is passed to the typing unit.

At the end of the printout of the station poll code, start-stop clock 309 pulses state logic 301. State logic 301 thereupon deletes the bit in the first stage of main shift register 315. This enables high speed clock 323, which now concurrently advances counter 314 and register 315 until the next bit appears in the first stage of the register. This corresponds to the first addressee station designated by the address code in the heading of the message. At this time state logic 301 arranges the generation and transmission of the code character "ENQ," passing this character to the line and to typing unit 304. After the character is generated, start-stop clock 309 again pulses state logic 301, which, in turn, energizes CEC lead 337 to pass the call-in code to shift register 308 and then enables data control 305 to pass the call-in code to the output line and to typing unit 304. Accordingly, the code sequence "ENQ-CEC" ("CEC" designating the call-in code of the first address station), is transmitted to line 300 and printed by typing unit 304. State logic 301 also restarts time out circuit 310. The line controller now awaits the response of the addressee station. The outlying stations recognize the code sequence as a selection sequence inquiring whether the station is prepared to receive a message. Finally, state logic 301 restarts time out circuit 310.

The party line stations respond to the call-in code sequence with either the code character "ACK," indicating that it is ready to receive, the code character "NAK," indicating that it is not ready to receive, or the code character "CAN," indicating that the prior message was received improperly. In the event, however, that the addressee station responds with an improper character, time out circuit 310 is reset and the improper character is detected by character detection gates 312. Gates 312, in turn, indicate to state logic 301 that an improper character has been received. State logic 301 now energizes ENTER lead 340 in a manner to insert a "1" bit in the final stage of main shift register 315. This has the effect, as will be seen hereinafter, of recirculating the bit corresponding to the addressee station from the first stage to the $n$th stage of register 315. State logic 301 also codes write gates 307 with the code character "R" and then arranges that this code character be sent to typing unit 304.

After the code character "R" is printed, state logic 301 energizes CEC lead 337, whereby the call-in code of the addressee station is passed to write gates 307. State logic 301 thereafter arranges that code character "CEC" is printed by typing unit 304. Accordingly, if a bad response is received from the addressee station, state logic 301 arranges that the bad character response code character "R" with the addressee station call-in character be sent to typing unit 304. Thereafter, state logic 301 deletes the bit in the first stage of main shift register 315, permitting the advance of register 315 and counter 314 to the next adressee station and thereupon sending the code sequence "ENQ-CEC" to inquire whether the next addressee station is ready to receive a message. This sequence is, of course, sent to line 300 and to typing unit 304 to provide a printout indicating that the addressee station is called. Time out circuit 310 is restarted and the line controller now awaits the response.

In the event that the addressee station fails to respond, time out circuit 310 times out and pulses state logic 301. State logic 301 thereupon arranges the generation of the code sequence "T-CEC" for application to typing unit 304 in substantially the same manner as previously described with respect to the failure of an addressee station to respond with the proper character. In this event, of course, the code sequence comprises "T-CEC," indicating that the addressee station failed to respond. State logic 301 also reinserts a bit in the final stage of main shift register 315 and then proceeds to delete the bit in the first stage of the register and send the code sequence "ENQ-CEC" of the next addressee station to line 300 and to the typing unit. Time out circuit 310 is also restarted.

If the addressee station responds that the prior message was improperly received by sending the code character "CAN," time out circuit 310 is reset and character detection gate 312 indicates the reception of this character to state logic 301. State logic 301 thereupon enters a bit in the final stage of main shift register 315 and arranges the generation of the code sequence "C-CEC" for application to typing unit 304. A printout is thus provided to indicate that the addressee station responded that the prior message was improperly received. Thereafter, state logic 301 deletes the bit in the first stage of main shift register 315 and sends the code character sequence "ENQ-CEC" to line 300 and to typing unit 304, thus inquiring whether the next addressee station is ready to receive and at the same time providing a printout. State logic 301 also resets time out circuit 310 and the line controller is prepared for the response of the addressee station.

If the addressee station responds that it cannot receive by returning the code character "NAK," start-stop clock 309 resets time out circuit 310 and the character is inserted in register 308. Character detection gate 312 pulses state logic 301, indicating that the character "NAK" has been received. State logic 301, in turn, energizes ENTER leads 340 in a manner to insert a bit in the final stage of register 315. At this time state logic 301 deletes the bit in the first stage of register 315 and, when the circuits advance to the next addressee station, arranges the generation of the code character sequence "ENQ-CEC" for application to line 300 and typing unit 304. Time out circuit 310 is again restarted and the line controller awaits the response of the next addressee station.

If the addressee station responds that it is ready to receive by returning the code character "ACK," time out circuit 310 is reset and character detection gate 312 indicates to state logic 301 that the code character "ACK" has been received. In this event state logic 301 energizes ENTER leads 340 in a manner to insert a "0" bit in the final stage of main shift register 315. This has the effect of clearing the $n$th stage and thus blocking the recirculation of the bit in the first stage to the $n$th stage of register 315. State logic 301 now deletes the bit in the first stage of the register and generates the code character sequence "ENQ-CEC" to inquire of the readiness of the next addressee station. Time out circuit 310 is again restarted and the line controller awaits the response of the addressee station.

To summarize the above described operations in the heading delivery state, each addressee station is called when main shift register 315 advances to the bit corresponding to the addressee station. This bit is recirculated or entered in the final stage of register 315 if the addressee station responds that it is not ready to receive, responds that the previous message was improperly received, responds with an improper character or fails to provide any response. Alternatively, the bit is discarded if the station responds that it is ready to receive. Main shift register 315 continues the advance to permit the calling of each addressee station, whereupon all bits corresponding to stations responding "ACK" are eliminated and all bits corresponding to stations having responses other than "ACK" are retained in main shift register 315.

When main shift register 315 is advanced through all of its stages, main binary counter 314 is, of course, concurrently advanced through all of its corresponding positions. Upon main binary counter 314 being advanced to the last or $n+1$, position, $n+1$ detector 327 is operated to reset main binary counter 314. Since main shift register 315 also has $n+1$ stages, it is at this time completely recirculated and back to its initial position. Thus, with main shift register 315 back in its initial positon, $n+1$ detector 327 resets main binary counter 314 and ALL-"0" detector 326 pulse state logic 301 by way of ALL-"0" lead 333. This pulse is passed to a counting arrangement in state logic 301 which maintains the count of the number of cycles of main binary counter 314.

The heading delivery process described above is now repeated with the exception that the addressee stations responding that they are ready to receive are, of course, not called again since their corresponding bits have been deleted from main shift register 315. At the completion of this second cycle, counter 314 is again reset, and a pulse is again applied to state logic 301, which now indicates that two cycles have been completed. Subsequent cycles are similarly provided until eight cycles are completed. At this time state logic 301 advances to the alternate delivery state in the event that all of the addressee stations have not responded that they are ready to receive. Alternatively, state logic 301 advances to the end delivery state if all the addressee station responded that they are prepared to receive.

Assume first that at least one station has not responded that it is prepared to receive. This fact is memorized by state logic 301 during each cycle and after the eighth cycle of counter 314 the subsequent pulse from high speed clock 323 applied by way of high speed CLOCK lead 343 pulses state logic 301 which steps to the alternate delivery state. It is, of course, recalled that after sending the last "CEC" code and receiving a response from the addressee station, the generation and transmission of the code character sequence "ENQ-CEC" for the next station is initiated. At this time, with state logic 301 advanced to the alternate delivery state, INSERT II lead 349 is pulsed, whereby a bit is inserted in the second stage of main shift register 315. Accordingly, register 315 and main binary counter 314 advance, as previously described, until the bit inserted in the second state advances to the first stage. Accordingly, after the generation and transmission of the code character "ENQ,' when CEC lead 337 is pulsed, the call-in code of the first addressee station corresponding to the second stage is generated and transmitted to the line. This station is designated as the alternate or intercept, station and will print a message heading consisting of the call-in characters of the addressee stations who have not responded that they are ready to receive.

It is noted that in the event the alternate delivery station returns a bad response, or returns the code character "NAK" or "CAN," or fails to respond, state logic 301 provides the usual operations (such as a diagnostic printout for a bad response, time out, etc.). DELETE lead 264 is not pulsed, however, whereby the code sequence for calling the alternate delivery station is again repeated until this station responds with the code character "ACK." It is, of course, apparent that the alternate delivery station may be attended to insure that all alternate delivery messages will be received. In addition, it is noted that the alternate delivery station preferably is arranged to print any incoming data following the reception of its own call-in character.

After the alternate delivery station responds with the character "ACK," detection gates 312 advise state logic 301 that this character has been received. State logic 301 now proceeds to code write gates 307 with the code character "Delete" and arranges the line controller to send the code character to line 300. After the generation of this character start-stop clock 309 pulses state logic 301 which, in turn, repeats the sequence for generating and transmitting the code character "Delete." This cycle is repeated six times, the six "Delete" characters being sent to the alternate delivery station to provide a leader in the tape which is conventionally punched at the alternate delivery station.

After the generation of the sixth "Delete" character, start-stop clock 309 again pulses state logic 301 which, in turn, codes write gates 307 with the code character "SOH." This character is sent to line 300 and is recorded by the alternate delivery station to indicate the start of the message heading.

At the termination of the generation of the character "SOH," start-stop clock 309 again pulses state logic 301. State logic 301 pulses DELETE lead 264, advancing main shift register 315 and main binary counter 314 to the next bit in register 315. This will correspond to the first address station which did not respond that it was ready to receive. State logic 301 also pulses CEC lead 337, thereby coding write gate 307 with the call-in character of this addressee station. The call-in character is thus sent to line 300, under the control of state logic 301, to be recorded at the alternate delivery station.

After the generation and transmission of the call-in character, state logic 301, in response to the pulse from start-stop clock 309, again deletes the bit in the first stage of main shift register 315. Accordingly, register 315 and counter 314 advance to the next addressee station which failed to respond that it was ready. At this time the call-in character of this next station is transmitted to line 300 in the same manner as previously described. This cycle is repeated until all the addressee stations are called and all of the bits are deleted in main shift register 315. Thus, the alternate delivery station has recorded in the message heading the call-in characters of each addressee station which failed to respond that it was ready to receive.

When the final bit is deleted in main shift register 315, the register, together with counter 314, advance to their final positions. At the final position, $n+1$ detector 327 resets counter 314. Accordingly, a pulse is applied to All-"0" lead 333. This advances state logic 301 to the end delivery state.

With stage logic 301 stepped to the end delivery state, INSERT lead 299 is pulsed. This inserts a bit in the first stage of register 315 whereby high speed clock 323 stops, maintaining register 315 and main binary counter 314 in their initial positions. At this time, stage logic 301 codes the character "ENQ" on write gates 307 and arranges the transmission of the code to line 300. After the generation of this code, state logic 301 codes the device control character "DC" on write gates 307, passing this code to line 300. As described hereinafter, the code character sequence "ENQ-DC" is detected by all of the outlying stations, enabling the addressee stations who responded that they are ready to unblind and print all of the subsequent data text. After the code character "DC" is transmitted, start-stop clock 309 again pulses state logic 301, which advances to the text state.

If all of the addressee stations had responded that they are ready to receive the message, state logic 301 does not go into the alternate delivery state. In this event state logic 301 does not record a negative response from any addressee station while the line controller circuits advance through the eighth cycle. It is noted that all addressee stations may have responded "ready" prior to the eighth cycle, whereby the circuits rapidly advance through the cycle without stopping. After the eighth cycle, therefore, and in response to the clock pulse on high speed CLOCK lead 343, state logic 301 advances directly to the end delivery state. In this state, as previously described, a bit is inserted in the first stage of register 315 whereby the register and counter 314 are stopped in their initial positions. Thus, after the generation of the code character "ENQ" and in response to the pulse from start-stop clock 309, state logic 301 codes device control character "DC" on write gates 307 and arranges for the character to be passed to line 300 in the same manner as previously described. State logic 301 then advances to the text state after the transmission of the code character "DC."

With state logic 301 stepped to the text state, the start-of-text character "STX" is coded on write gate 307. State logic 301 then arranges to pass the code character to line 300. When the start-of-text character "STX" is received by the outlying station selected to send the data message, this station will proceed to send the message text, as described hereinafter. At the same time, state logic 301 restarts time out circuit 310. Accordingly, the originating station sends the message text to all the addressee stations who are prepared to receive and to the alternate delivery stations if one or more of the addressee stations indicated it was not prepared to receive.

During the transmission of the message text, each incoming character starts up start-stop clock 309. Start-stop clock 309 resets time out circuit 310 and thereafter pulses state logic 301 which, in turn, restarts time out circuit 310. Accordingly, the text is monitored by the line controller which checks to see if there is a message interruption.

Assume now that the message is interrupted. This permits time out circuit 310 to time out, pulsing T/O lead 274. State logic 301 thereupon goes to the major alarm state. In this state, as previously described, the code character sequence "ENQ-EOT" is generated and transmitted to stop and clear all of the outlying stations, including the sending station, the addressee stations and the alternate delivery station. In addition, a diagnostic printout is provided. This printout includes the code character sequence "T-SPC" (the "SPC" character being derived from the last poll store binary counter 316 identifying the sending station). Thereafter, as previously described, the line controller returns to the test poll state, a new test polling is started and, when a proper response is received, a new poll is initiated.

Under normal conditions the message text is terminated by the end-of-text code character "EOT." When this character is received by data set 302 and inserted by start-stop clock 309 into character shift register 308, character detection gate 312 signals state logic 301, which advances to the idle line state.

In the idle line condition, state logic 301 energizes INHIBIT lead 401. Data control 305 proceeds to block signals from the receive portion of data set, thereby blinding shift register 308 and start-stop clock 309 to incoming signals. At the same time, state logic 301 codes write gates 307 with the code character "DLE," passing this code character to line 300. At this time the transmitting station may continue to send "Delete" characters. Since the line controller is blinded, these characters will be discarded. It is noted at this time that the transmission of the code character "DLE" places the outlying stations in the poll state, prepared to receive their poll characters since the character "DLE" does not immediately follow the major alarm "ENQ-EOT" code sequence, which code sequence would place the outlying stations in the text poll state. Accordingly, the outlying stations recognize that the line controller is about to go into the poll state.

In the idle line state, state logic 301 provides no further function until incoming line 300 goes idle. At this time idle line timer 403, which timer is connected to the output of the receive side of data set 302, begins to time out. If incoming line 300 is idle for a predetermined length of time, idle line timer 403 passes a pulse by way of IDLE lead 392 to state logic 301. This advances state logic 301 back to the poll state wherein, as previously described, the skip table is passed to main shift register 315. Register 315, with counter 314, will advance until a match is obtained with last poll store binary counter 316. The bit is now deleted from the first state of main shift register 315 to advance the circuits to the next outlying station to be polled.

After all of the outlying stations are polled counters 314 and 316 advance to their final positions and register 315 recycles to its initial position. At this final position, counters 314 and 316 are reset, as previously described. When main binary counter 314 is reset, all-"0" detector 326 pulses state logic 301. Thereupon, upon the application of the next clock pulse to high speed clock 343, state logic 301 again inserts the skip table into main shift register 315 and deletes the bit in the first stage of the register. Accordingly, the circuits again advance to the first station to be polled.

PARTY LINE STATIONS

Refer now to FIG. 2 which discloses a party line station suitable for cooperating with the main station line controller. The system contemplates a plurality of party line stations, each of which is substantially identical to the station shown in FIG. 2. Each station preferably includes a data set, such as data set 500, which operates in substantially the same manner as the data set in the line controller. Accordingly, incoming line signals from line 300 are converted into data signals by the receive portion of data set 500 and these data signals are applied to input selector 502. Alternatively, output data signals applied by output selector 503 to the send portion of data set 500 are converted to line signals for application to line 300.

Each outlying station is provided with a terminal attendant set, generally indicated by block 501. The terminal attendant set preferably includes a transmitter, such as a message tape transmitter, and a recorder or a data printer. Terminal attendant set 501 also includes the conventional keys and lamps and simple logic circuits necessary for providing supervisory functions, described hereinafter.

Terminal attendant set 501 is arranged to start the tape transmitter therein when incoming terminal lead START is energized. The tape transmitter thereupon applies serial data to terminal OUT which extends to an input of input selector 502. The recorder in terminal attendant set 501 is unblinded when incoming terminal lead PRINT is energized, whereby incoming serial data applied to terminal IN from output selector 503 is received and printed by the recorder.

Terminal attendant set 501 also includes terminal outputs which extend to leads CANCEL, READY TO SEND and READY TO RECEIVE. When the transmitter is prepared to transmit, having a message tape inserted therein and a start key (not shown) operated manually by an attendant or by some mechanical means, output lead READY TO SEND is energized. When the terminal recorder is in the proper operating condition and prepared to accept incoming data in the event that input lead PRINT is energized, READY TO RECEIVE lead has an energizing signal applied thereto. Finally, terminal attendant set 501 includes means for detecting improper reception of incoming data messages, which means may include conventional parity check circuits or arrangements to detect message interruptions. In the event that these circuits determine that a data message is received improperly, terminal attendant set 501 energizes lead CANCEL.

Input selector 502 is normally arranged to accept data from data set 500 and apply it to clock and sampler 505. Alternatively, however, input selector 502, when enabled by output terminal "1" of send flip-flop 523, accepts the data from the output terminal of terminal attendant set 501 for application to clock and sampler 505. The data accepted by clock and sampler 505 is passed serially to character detector, generator and store 504 and, after the passage of each character, an output pulse is provided by clock and sampler 505 to the clear input of call flip-flop 508.

Character detector, generator and store 504 advantageously comprises a shift register for storing the incoming serial data from clock and sampler 505 together with logic circuitry. This logic circuitry functions to accept incoming signals from generator logic and timing circuit 506 on any one of incoming terminals ACK, NAK or CAN and code the corresponding code character on the shift register stages in character detector, generator and store 504. Conversely, the logic circuitry in character detector, generator and store 504 may detect the character in the shift register and energize the several output terminals, such as DLE, ENQ, EOT, SOH, etc., in accordance with the character detected. Finally, store 504 serially applies the characters from the shift register therein to output selector 503. Output selector 503, in turn, passes the serial characters to the send portion of data set 500 and the input terminal of set 501 in accordance with energizing signals applied thereto by generator logic and timing circuit 506, send flip-flop 523 and unblind flip-flop 530.

Generator logic and timing circuit 506 contains conventional logic circuitry for pulsing the input terminals of character detector, generator and store 504 in accordance with the conditions on leads CANCEL, READY TO SEND and READY TO RECEIVE. The means to enable generator logic and timing circuit 506 to provide these functions are controlled by the states of poll flip-flop 518, call flip-flop 508 and test poll flip-flop 512 and the pulsing of output terminal SPC (CEC) of store 504 in a manner described hereinafter.

Consider now the operation of the outlying station. It is recalled that the line controller initially sends the major alarm code sequence, which code sequence comprises the characters "ENQ–EOT." Upon the reception of the code character "ENQ" by data set 500 the character is serially passed through input selector 502 to clock and sampler 505. Accordingly, the code character "ENQ" is serially shifted into the shift register in character detector, generator and store 504.

In response to the storage of the code character "ENQ," output terminal ENQ of store 504 is pulsed. This pulse is passed to the SET input of call flip-flop 508. Accordingly, call flip-flop 508 applies an energizing signal to its terminal "1" output to enable gate 513. When the code character "EOT" is received by data set 500 and passed to character detector, generator and store 504, output terminal EOT of the store is pulsed. This pulse is passed through enable gate 513 to set ENQ-EOT memory flip-flop 510. Concurrently, clock and sampler 505 clears call flip-flop 508. The setting of flip-flop 510 indicates that the line controller is in the major alarm state.

After the major alarm state the line controller initiates the test poll sequence by sending the code character "DLE" followed by the station poll codes. When the code character "DLE" is stored by character detector, generator and store 504, output terminal DLE is pulsed. This pulse is passed to AND gate 511. The other input to AND gate 511 is enabled by output terminal "1" of ENQ-EOT memory flip-flop 510. Accordingly, the pulse on output terminal DLE of store 504 is passed through AND gate 511 to the SET input of test poll flip-flop 512. The setting of this flip-flop indicates that the line controller is in the test poll state. In addition, the pulse from output terminal DLE clears ENQ-EOT memory flip-flop 510.

The various station poll codes are now transmitted by the line controller. At this time, of course, another major alarm may occur. This results in a repetition of the above described sequence. When the code character "EOT" is stored by character detector, generator and store 504, however, the pulse on output terminal EOT is passed through OR gate 514 to clear test poll flip-flop 512. Accordingly, in the event a major alarm occurs, the outlying station is again in a condition to initiate the new test poll state.

Assume now that in the test poll state the station poll code is received. When this code is stored output terminal SPC (CEC) of character detector, generator and store 504 is pulsed. This pulse is passed to one input of generator logic and timing circuit 506. With another input of generator logic and timing circuit 506 energized by output terminal "1" of test poll flip-flop 512, the logic and timing circuit examines the conditions of leads CANCEL and READY TO SEND. Accordingly, generator logic and timing circuit 506 pulses input terminal CAN of store 504 if lead CANCEL is energized, pulses input terminal ACK of store 504 if READY TO SEND lead is energized and pulses input terminal NAK of store 504 if the lead ready to SEND is not energized. The appropriate code is thus applied to the shift register in store 504 and serially passed to output selector 503. Concurrently, generator logic and timing circuit 506 passes an energizing signal to output selector 503 in a manner to pass the data to the send portion of data set 500, whereupon the appropriate line signals are applied to line 300 and then to the main station line controller.

The line controller may now continue to test poll other stations, return to the major alarm state or proceed on to the poll state, as previously described. If the line controller proceeds to the poll state the code character "DLE" is transmitted, followed by the station poll codes. When the code character "DLE" is received by the outlying station and stored by character detector, generator and store 504, output terminal DLE is again pulsed. The pulse on output terminal DLE is passed to AND gate 516. AND gate 516 is enabled at this time by the high condition on output terminal "1" of test poll flip-flop 512. Accordingly, the pulse from terminal DLE is passed through AND gate 516 and then through OR gate 514 to the CLEAR input of test poll flip-flop 512. The pulse from terminal DLE is also passed through OR gate 515 to the SET input of poll flip-flop 518. Accordingly, poll flip-flop 518 is set and test poll flip-flop 512 is cleared, indicating that the line controller is in the poll state.

The line controller now proceeds to send the various poll codes. In the event that the appropriate responses are not received, the line controller may return to the major alarm state, as previously described. Thus, the code sequence "ENQ-EOT" is again transmitted and the outlying station repeats the above described sequence. In this event when the code character "ENQ" is stored, character detector, generator and store 504 pulses output terminal ENQ. This pulse is passed through OR gate 509 to clear poll flip-flop 518, permitting the station to return to the major alarm state.

Return now to the poll state. After the station poll code of this particular station is received, character detector, generator and store 504 pulses output terminal SPC (CEC). With poll flip-flop 518 in the set condition, one input terminal of generator logic and timing circuit 506 is energized. The pulsing of terminal SPC (CEC) is applied to another terminal of logic and timing circuit 506, whereby the logic and timing circuit examines leads CANCEL and READY TO SEND. In this case the code character "NAK" or "CAN" will be coded on the shift register in store 504 and passed out through output selector 503 and data set 500 to line 300, if lead CANCEL is energized or lead READY TO SEND is not energized. Generator logic and timing circuit 506 is precluded from pulsing input terminal ACK of store 504, however, with poll flip-flop 518 in the set condition even when lead READY TO SEND is energized.

Assume now that when the station is polled the tape transmitter in set 501 is ready to send and that READY TO SEND lead is therefore energized. AND gate 520 is now enabled by poll flip-flop 518 and lead READY TO SEND. Accordingly, the pulse on output terminal SPC (CEC) is passed through AND gate 520 to the SET input of selected sender flip-flop 521 and to the SET input of send flip-flop 523 by way of OR gate 522. With send flip-flop 523 in the set condition, input terminal START of terminal attendant set 501 is energized, output selector 503 is enabled to pass the output of store 504 to data set 504 to data set 500, and input selector 502 is enabled to pass the output data from set 501 to clock and sampler 505. Accordingly, the message heading in the tape is transmitted from the output terminal of terminal attendant set 501 to line 300 by way of input selector 502, clock and sampler 505, character detector, generator and store 504, output selector 503 and data set 500.

The first character in the heading is the start-of-heading character "SOH." When this character is transmitted output terminal SOH of store 504 is pulsed. This pulse is passed through OR gate 509 to clear poll flip-flop 518. If the tape transmitter fails to start, the line controller goes to the major alarm state, sending the code sequence "ENQ-EOT." The character "ENQ" pulses output terminal ENQ of store 504. This pulse is passed through OR gate 509 to clear poll flip-flop 518.

As previously described, the line controller now proceeds to the heading reception state, wherein the address codes are registered. During this state, if any failure occurs, the line controller returns to the major alarm state, sending the code sequence "ENQ-EOT." At the outlying station, upon the reception of the code character "EOT," a pulse is applied to output terminal EOT of store 504. This pulse clears selected sender flip-flop 521 and, in addition, is sent through OR gate 524 to clear send flip-flop 523. Accordingly, the tape transmitter in terminal attendant set 501 is stopped and the outlying station returns to the initial condition.

Return now to the transmission of the message heading. This heading terminates when the tape transmitter sends the code character "STX." When this character is passed through character detector, generator and store 504 output terminal STX "Short" is initially pulsed, followed by the pulsing of output terminal STX. It is noted that the logic circuits in store 504 are arranged to first detect the "STX" character as soon as all the significant intelligence elements of the character are received by store 504. Accordingly, output terminal STX "Short" is pulsed before the full character is received, i.e., before certain of the final elements, such as the parity elements and the stop elements, are received. This pulse is passed through OR gate 524 to clear send flip-flop 523, thus stopping the tape transmitter in terminal attendant set 501. Thus, the tape transmitter is stopped prior to the termination of the transmission of the code character "STX," precluding the initiation of the transmission of the next character.

When send flip-flop 523 is cleared an energizing signal is passed to delay unit 525. This signal is then applied to AND gate 527. Accordingly, with selected sender flip-flop 521 set, AND gate 527 is enabled a predetermined interval after the clearing of send flip-flop 523. This interval is sufficiently long to block the subsequent pulse provided to AND gate 527 from output terminal STX of store 504. Accordingly, when the code character "STX" is transmitted from the local tape transmitter, send flip-flop 523 is cleared, stopping the tape transmitter in terminal attendant set 501 and AND gate 527 remains disabled until after the code character is passed to the line, thereby precluding the setting of flip-flop 523 by the subsequent pulse from output terminal STX of store 504.

At the line controller the reception of code character "STX" steps the line controller to the message delivery state. In this state the line cotnroller selects the various addressee stations, each addressee station being queried by the code sequence "ENQ-CEC." At the transmitting station call flip-flop 508 is set in response to the reception of the code character "ENQ" and then cleared when the "CEC" code is received. This process continues until all addressee stations and the alternate delivery station, if necessary, are called, whereupon the line controller sends the code sequence "ENQ-DC" to unblind the addressee station.

At the transmitting station the code character "ENQ" sets call flip-flop 508, as previously described. With selected sender flip-flop 521 set, AND gate 529 is enabled by flip-flop 521, by way of OR gate 528, and further enabled by call flip-flop 508. Accordingly, when code character "DC" is received, character detector, generator and store 504 pulses output terminal DC, which pulse is passed through AND gate 529 to set unblind flip-flop 530. The setting of unblind flip-flop 530 unblinds the recorder in terminal attendant set 501 and, in addition, energizes output selector 503 in a manner to extend the output of store 504 to the input terminal of terminal attendant set 501.

After sending the "unblind" code sequence the line controller then generates and transmits the code character "STX." At the sending station, character detector, generator and store 504 pulses output terminal STX, which pulse is applied to AND gate 527. Since send flip-flop 523 is now clear, AND gate 527 is enabled, passing the pulse from terminal STX through OR gate 522, thus setting send flip-flop 523. The setting of flip-flop 523, as previously described, starts the tape transmitter in terminal attendant set 501 and arranges to pass the data from the output terminal of set 501 through input selector 502, clock and sampler 505, store 504 and output selector 503 to data set 500. Thus, the message text is sent to line 300 and concurrently monitored by the recorder in terminal attendant set 501.

During the transmission of the message text the line controller monitors the message and in the event there is a message interruption, returns to the major alarm state. When the transmitting station receives the code character "EOT," selected sender flip-flop 521 and send flip-flop 523 are cleared, as previously described. In addition, unblind flip-flop 530 is cleared. This returns the station to its initial condition.

Assuming that no intervening major alarm situation occurs, the tape transmitter in terminal attendant set 501 proceeds to send the entire message, terminated by the end-of-message character "EOT." This character is detected by character detector, generator and store 504, clearing flip-flops 521, 523 and 530, as previously described. Accordingly, the sending station restores to its initial condition. At this time a new poll may be started with the code character "DLE" transmitted by the line controller. With ENQ-EOT memory flip-flop 510 in the clear condition and character detector, generator and store 504 pulsing output terminal DLE, AND gate 517 is enabled to pass the pulse through OR gate 515 to set poll flip-flop 518. Accordingly, the outlying station is prepared for a new poll sequence.

Assume now that the outlying station is not selected as a transmitting station. In this event selected sender flip-flop 521 remains in the cleared state. The outlying station, however, receives the message heading transmitted by the originating station. When the start-of-heading character "SOH" is received, character detector, generator and store 504 pulses output terminal SOH. This pulse is then passed through OR gate 509 to clear poll flip-flop 518. This precludes the outlying station from responding to its call-in code if it should appear in the message heading.

When the line controller queries the various addressee stations, call flip-flop 508 is set by character "ENQ" in the code sequence "ENQ-CEC" as previously described. If this station is then queried by the line controller sending the call-in code, output terminal SPC (CEC) of store 504 is pulsed (it being noted that the code character "SPC" and the code character "CEC" are identical for the station shown in FIG. 2). With call flip-flop 508 set, providing one energized input to generator logic and timing circuit 506, and the pulse on output terminal SPC (CEC) providing another energized input to generator logic and timing circuit 506, one of input terminals ACK, NAK or CAN of store 504 is pulsed by logic and timing circuit 506 in accordance with the conditions of leads CANCEL and READY TO RECEIVE. Specifically, input terminal ACK is pulsed if lead READY TO RECEIVE is energized, input terminal NAK is pulsed if lead READY TO RECEIVE a de-energized and input terminal CAN is pulsed if lead CANCEL is energized. The outlying station thus responds to the query of the line controller, indicating whether the recorder thereat is ready to receive. In addition, if it be assumed that lead READY TO RECEIVE is energized, AND gate 533 is enabled, since call flip-flop 508 is set, and the pulse from output terminal SPC (CEC) is passed through AND gate 533 to set selected receiver flip-flop 534. With selected receiver flip-flop 534 set, this outlying station is designated a selected addressee station and awaits the "unblind" code sequence from the line controller. It is noted that if the line controller at this time goes to the major alarm state, output terminal EOT of store 504 will be pulsed to clear flip-flop 534.

Assume now that the addressee station selection is concluded by the line controller, which then sends the code sequence "ENQ-DC" to unblind the addressee stations. When the code character "ENQ" is received by the outlying station, call flip-flop 508 is set, as previously described.

Thereafter, when code character "DC" is received, output terminal DC of store 504 is pulsed. This pulse is passed to AND gate 529. AND gate 529 at this time is enabled by call flip-flop 508 in the set condition and further enabled by selected receiver flip-flop 535 by way of OR gate 528. Accordingly, the pulse from output terminal DC is passed through AND gate 529 to set unblind flip-flop 530. The setting of unblind flip-flop 530, as previously described, unblinds the recorder in terminal attendant set 501 and extends the output of character detector, generator and store 504 through output selector 503 to the input terminal of set 501. Accordingly, the recorder at the outlying station is arranged to print the incoming data from line 300.

The outlying station now proceeds to record the message text. This recording process will be terminated by the end-of-text signal from the transmitting station or a major alarm code sequence from the line controller. In either event, when the code character "EOT" is received, output terminal EOT of character detector, generator and store 504 is pulsed. This pulse clears selected receiver flip-flop 504 and, in addition, clears unblind flip-flop 530. The outlying station is thus returned to its initial condition.

The alternate delivery station is arranged substantially the same as the station shown in FIG. 2 with the exception that output terminal "1" of selected receiver flip-flop 534 is also connected to input terminal PRINT of terminal attendant set 501. Thus, when the alternate delivery station is queried whether it is ready to receive, selected receiver flip-flop 534 is set, as previously described, and the tape transmitter is unblinded. The station is, therefore, enabled to record the call-in codes of the addressee stations which did not respond that they are ready to receive.

STATE LOGIC—DETAILED DESCRIPTION

Figure 3:
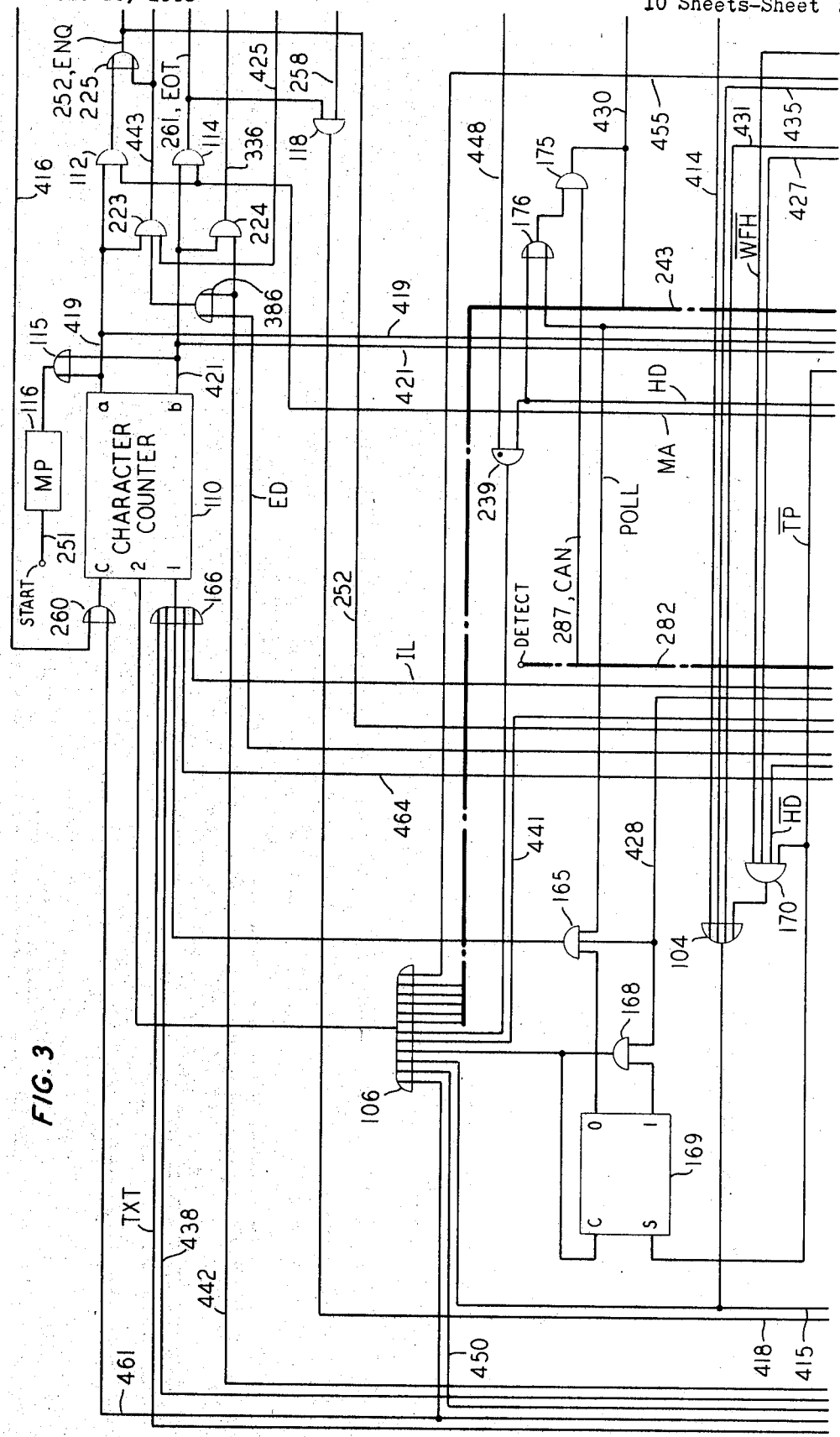
Figure 4:
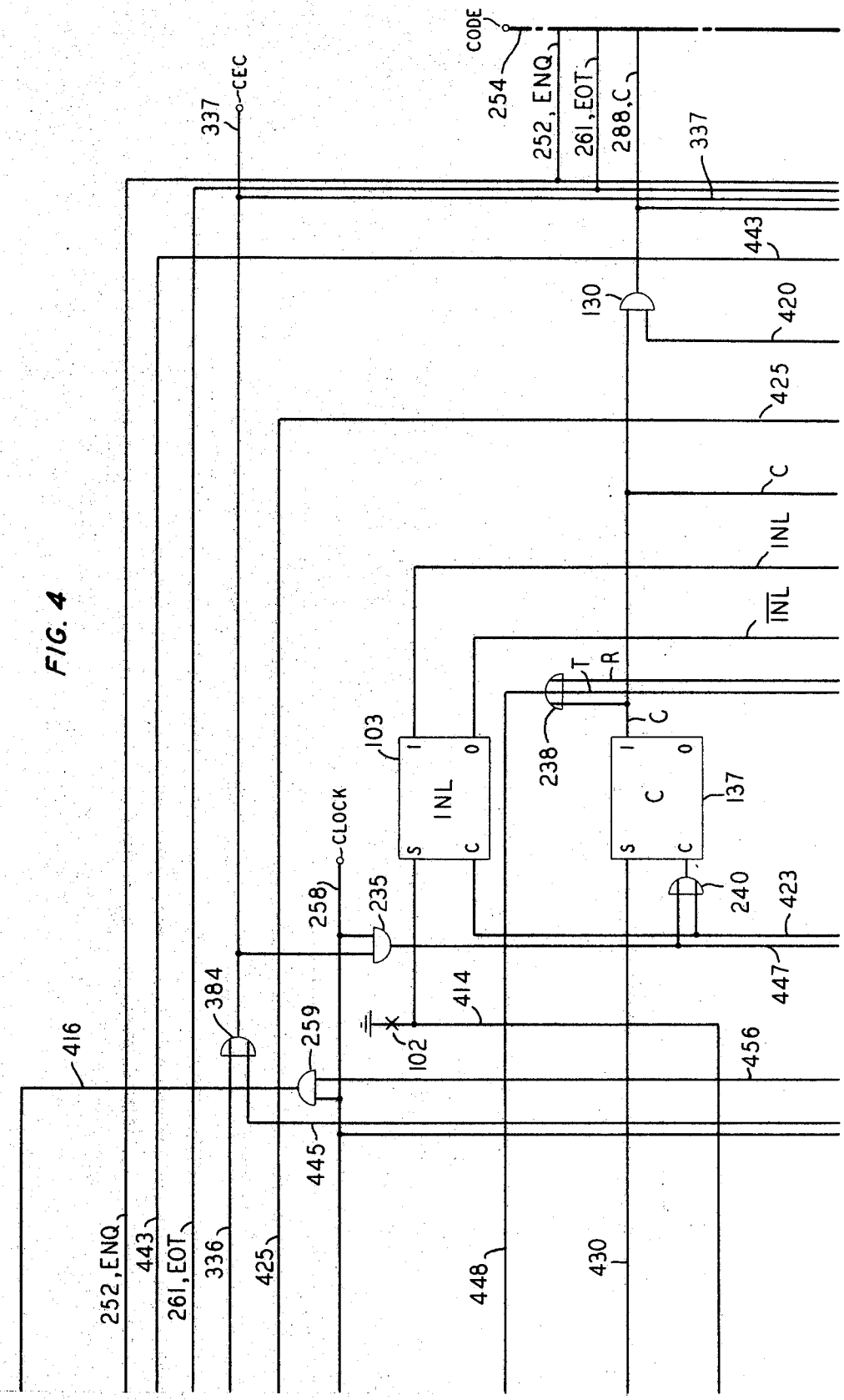

Refer now to FIGS. 3 through 10, showing the details of state logic 301. To initialize the circuit, key contacts 102, FIG. 4, are momentarily operated to the closed position. This extends ground to the SET input of initializing flip-flop 103. Flip-flop 102 set removes an enabling potential normally applied via lead $\overline{INL}$ to AND gate 143 and to AND gate 156, FIG. 6. Flip-flop 103 set also partially enables AND gate 135, FIG. 5, via lead INL OR gate 142, FIG. 6; and lead 412. The setting of flip-flop 103 indicates that the logic circuit is in the initializing state.

INITIALIZING STATE

Figure 7:
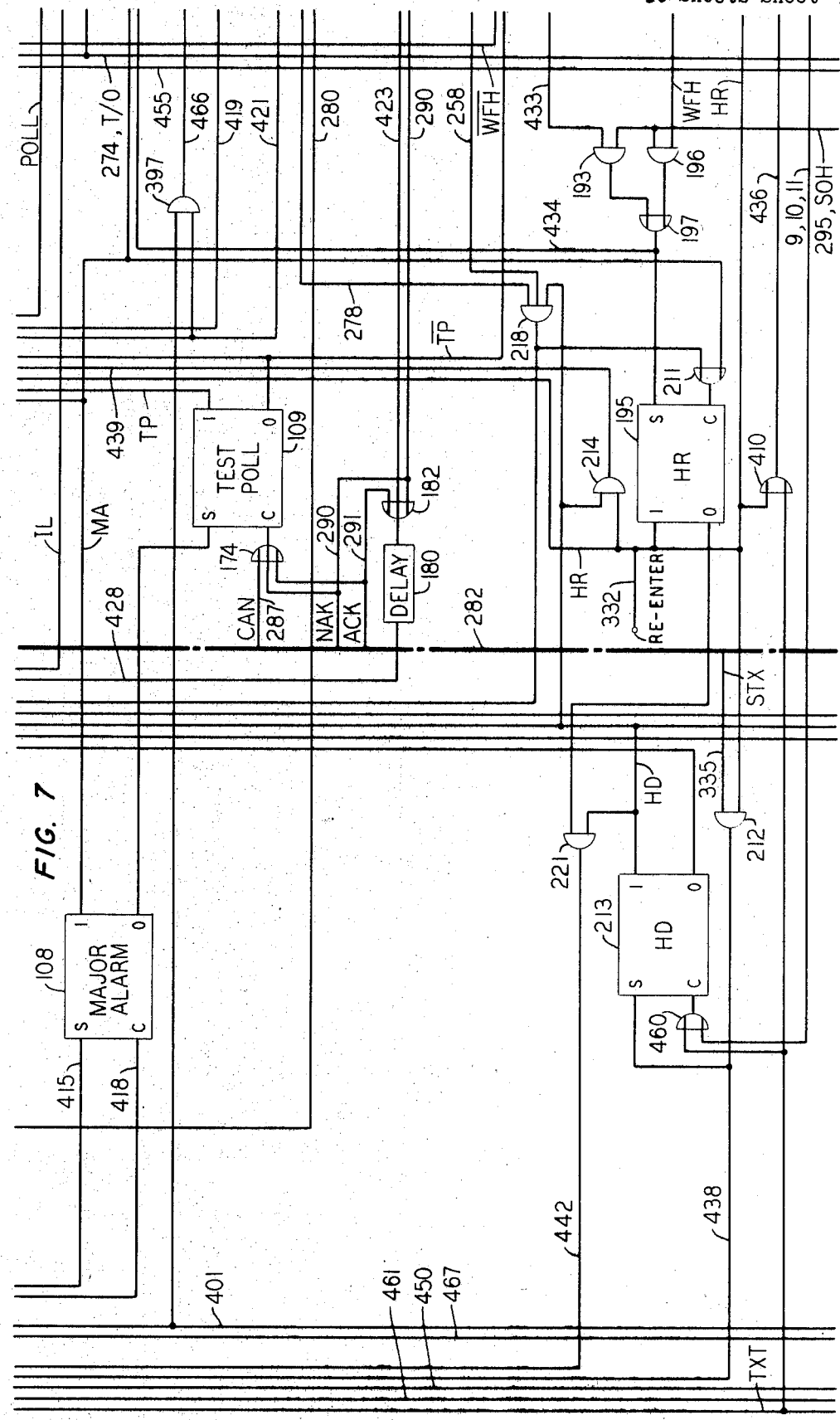

The momentary operation of key contacts 102 also pulses the SET input or major alarm flip-flop 108, FIG. 7, via lead 414; OR gate 104, FIG. 3; and lead 415. In addition, the key contacts pulse passed by way of OR gate 104 is applied through OR gate 106 to input terminal "2" of character counter 110. Thus, major alarm flip-flop 108 is set and an input pulse is applied to input terminal "2" of counter 100.

Counter 110 comprises a two-stage binary circuit which provides a "one" count or a "two" count at the output thereof in accordance with the enabling of input terminals "1" and "2" and in response to clock pulses from CLOCK lead 258, FIG. 4, applied via normally enabled AND gate 259, lead 416 and OR gate 260, FIG. 3, to terminal "c." Specifically, when counter 110 is enabled at input terminal "2," output terminal "a" is energized until a clock pulse is provided to input terminal "c." Thereupon, output terminal "b" is enabled and the energization of output terminal "a" is removed. Alternatively, if input terminal "1" is pulsed, output terminal "b" of counter 110 is energized until a clock pulse is applied to input terminal "c." Thereupon, the energization of output terminal "b" is removed.

Recalling now that the pulse from key contacts 102 is applied to input terminal "2" of counter 110, output terminal "a," in turn, is energized. This enables AND gate 112 and provides a pulse to monopulser 116 by way of OR gate 115. The operation of monopulser 116 passes a pulse to START lead 251 which extends to start-stop clock 309 to initialize its operation, as previously described. This pulse from monopulser 116 is generated after a delay to permit other circuits to operate, as described hereinafter. Advantageously, the pulse provided by monopulser 116 may also be used as a reading pulse for various gates which provide character coding, such as gates 112, 114 and others, although other methods for providing appropriate timing for the coding pulses may be utilized.

Figure 5:
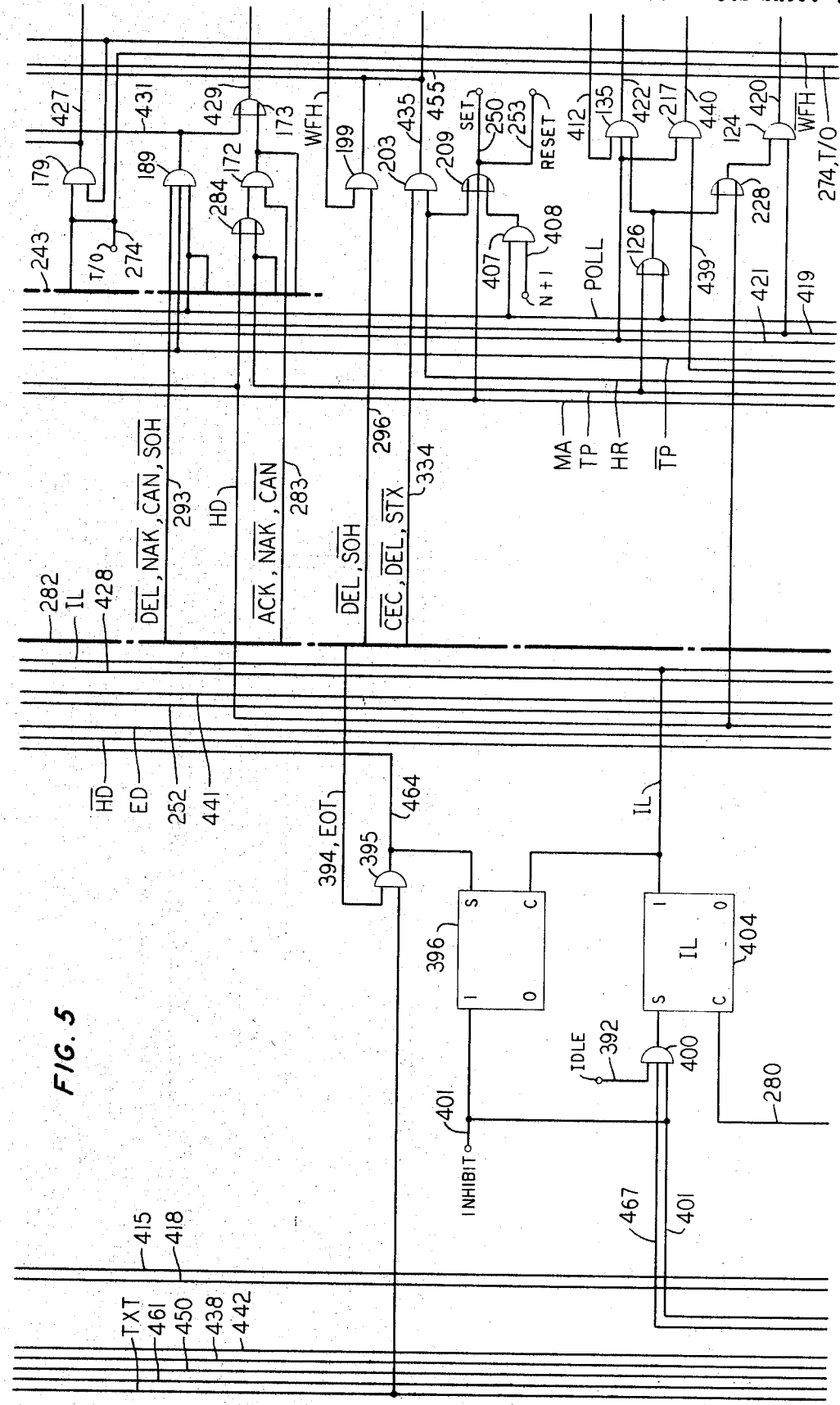

With major alarm flip-flop 108 set, the potential of output terminal "1" goes high and the transistion produces a pulse on lead MA which is applied to RESET lead 253 and to SET lead 250, FIG. 5, by way of OR gate 209. The pulse on SET lead 250, as previously described, writes a "1" in the first stage of main shift register 315 and a "0" in the other stages of the shift register. The pulse passed to RESET lead 253 resets main binary counter 314 to the initial count.

Figure 8:
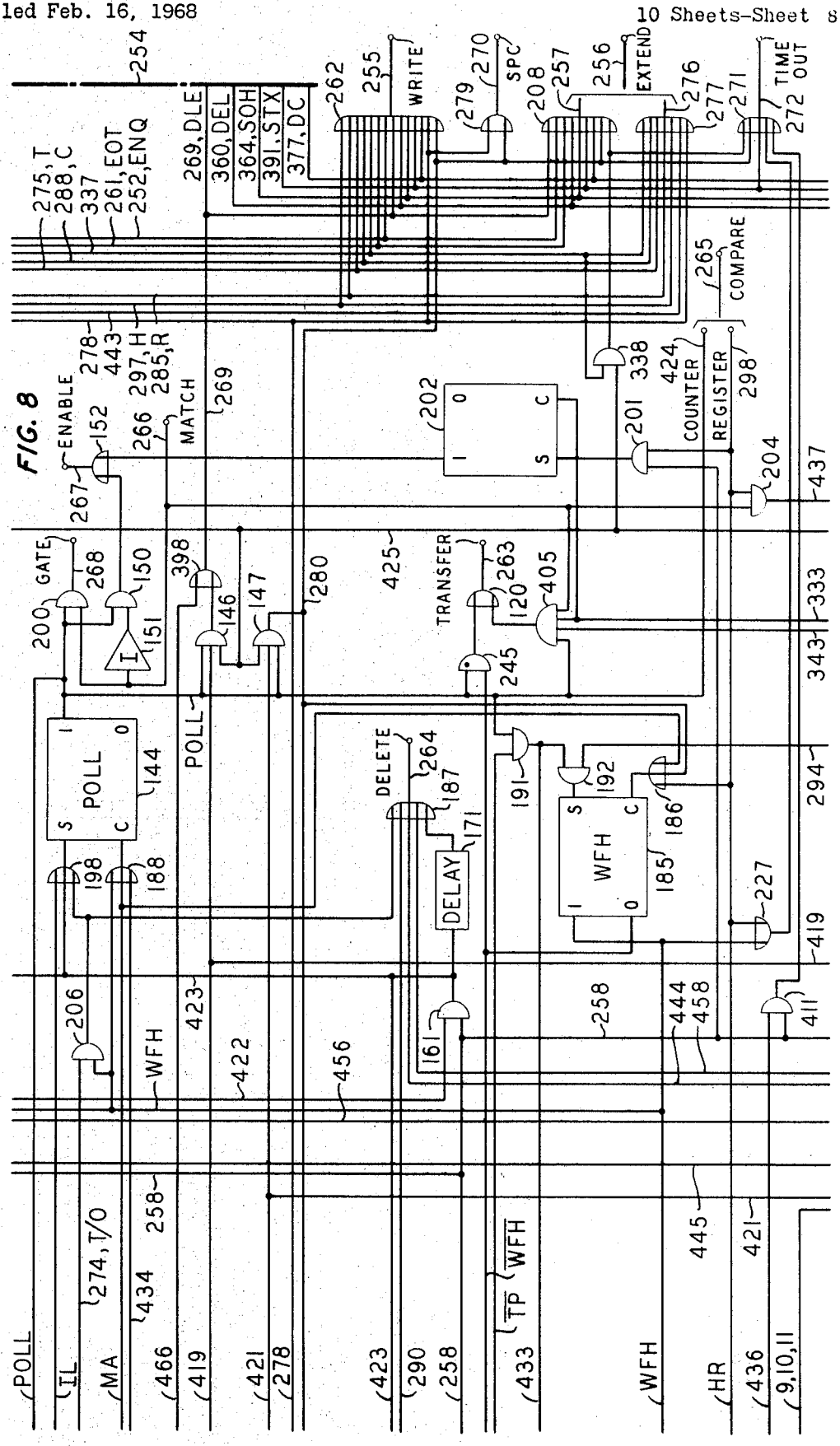

The energizing of output lead MA of major alarm flip-flop 108 also enables AND gates 112 and 114, FIG. 3. Since output terminal "a" of the character counter 110 is energized, also enabling AND gate 112, an enabling signal is generated at the output of the gate and passed via OR gate 225 to ENQ lead 252, which extends to the common cable designated CODE leads 254, FIG. 4. Thus, as previously described, the code character "ENQ" is coded on write gates 307 via CODE leads 254. In addition, WRITE lead 255, FIG. 8, is pulsed by ENQ lead 252 via OR gate 262 to enable write gates 307 to pass the code character to register 308. Also, lead 257 is energized via OR gate 208. This passes a pulse through EXTEND leads 256 to data control 305 to extend the output of character shift register 308 to data set 302. Thus, character "ENQ" is passed to output line 300, as previously described.

After the generation of character "ENQ" and the passage of the character to the line, a pulse is derived from start-stop clock 309 via lead 258, as previously described. This pulses input terminal "c" of character counter 110 via normally enabled AND gate 259 and OR gate 260, de-energizing output terminal "a" and energizing output terminal "b." The pulse derived from output terminal "b" is applied to monopulser 116 by way of OR gate 115 to again start up start-stop clock 309. In addition, with major alarm flip-flop 108 enabling AND gate 114, the energization of output terminal "b" of counter 100 enables gate 114 to apply an enabling signal to EOT lead 261. This signal is passed through CODE leads 254 whereby the code character "EOT" is coded on write gates 307. In addition, write gates 307 are pulsed by EOT lead 261 via OR gate 262 and lead 255 to pass the character to register 308. Lead 257 is also pulsed by lead EOT via OR gate 208. Thus, data control 305 is operated to extend shift register 308 to data set 302, sending the character "EOT" to the line, as previously described. In addition, the output condition derived from AND gate 114 is passed to AND gate 118. This enables AND gate 118.

At the conclusion of the generation of character "EOT," the start-stop clock again passes a pulse to CLOCK lead 258 and thus to terminal "c" of counter 110. In addition, the pulse on lead 258 is passed to AND gate 118, which is now enabled. The pulse passed through AND gate 118 clears major alarm flip-flop 108 by way of lead 418. The clearing of major alarm flip-flop 108 passes an enabling pulse from output terminal "0" to the SET input of test poll flip-flop 109. The setting of flip-flop 109 moves the logic circuit to the initializing test poll state. Finally, the clock pulse applied to input terminal "c" of counter 110 removes the energization at output terminal "b" and restores counter 110 to its initial condition.

INITIALIZING TEST POLL STATE

The pulse derived from output terminal "1" of test poll flip-flop 109 is passed by way of lead TP to common cable 243 in FIG. 5 and through the cable via OR gate 106, FIG. 3, to input terminal "2" of character counter 110. Counter 110 is thus once again operated, whereby output terminal "a" is energized. Thus, start-stop clock 309 is restarted in preparation of the generation of another character. The setting of test poll flip-flop 109 also passes enabling potentials through lead TP and OR gate 126, FIG. 5, to AND gate 135 and to AND gate 124 by way of OR gate 228.

Figure 6:
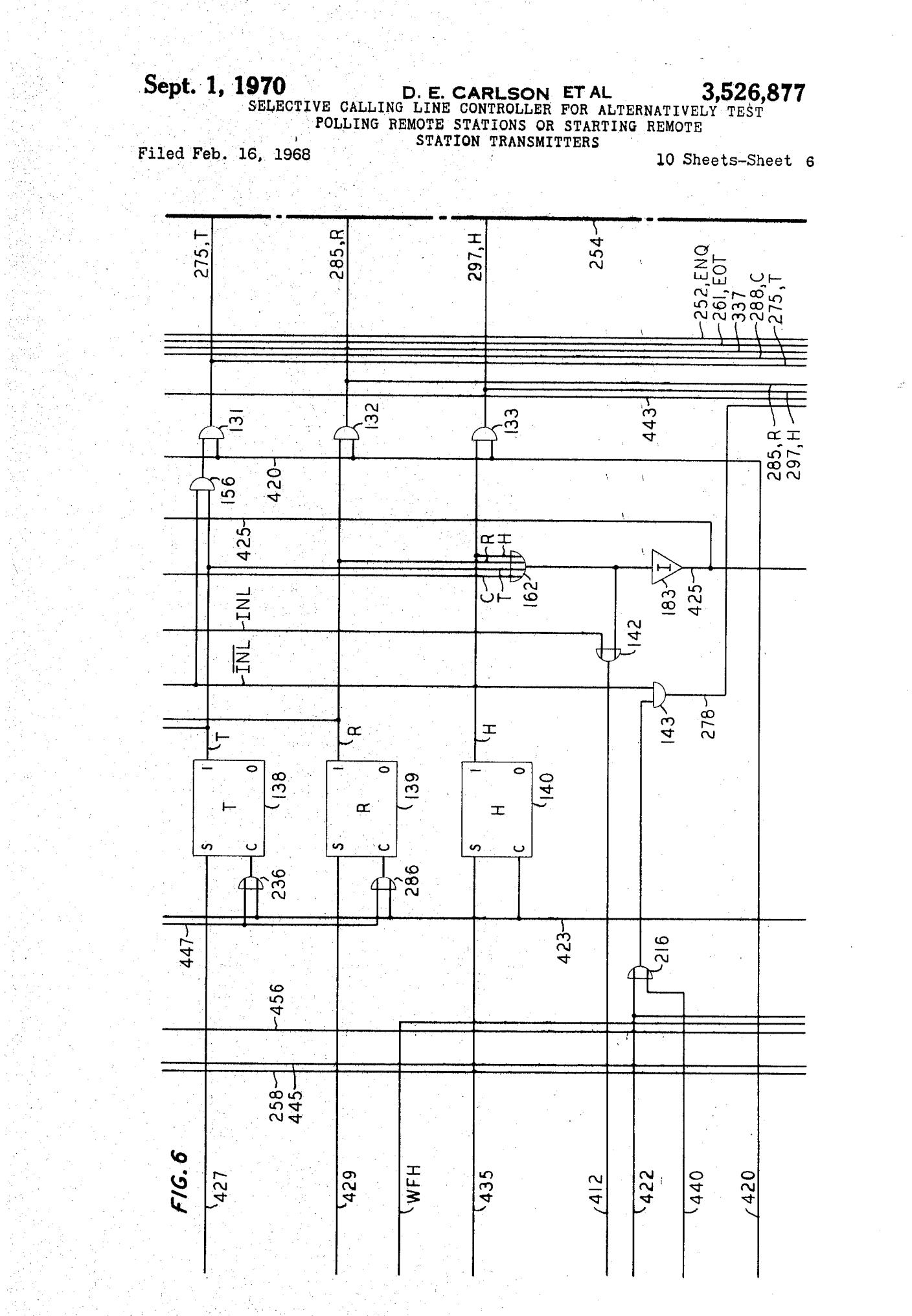

With output terminal "a" of character counter 110 energized, an enabling signal is passed through lead 419 and AND gate 124 to AND gates 130 through 133, FIG. 6, via lead 420. At this point in the test poll, as described hereinafter, the various diagnostic printouts will be provided in accordance with the operated one of flip-flops 137 to 140 in FIG. 6. In this specific state, however, namely, the initializing test poll state, printout is not enabled since no one of flip-flops 137, 139 or 140 is set and the output of flip-flop 138 is blocked by AND gate 156 which, in turn, is disabled by lead INL from flip-flop 103. Accordingly, clock 309 will cycle as though generating a character although data control 305 is not enabled to provide transmission or printout.

At the termination of the suppressed character generation, start-stop clock 309 again pulses counter 110 via lead 258 whereby output terminal "b" is energized. This energizes AND gate 135 via lead 421, AND gate 135 having been previously enabled by test poll flip-flop 109 via OR gate 126 and by flip-flop 103 via OR gate 142 and lead 412. AND gate 135 passes an enabling signal via lead 422 to AND gate 161, FIG. 8, and to AND gate 143, FIG. 6, via OR gate 216. AND gate 143 is blocked at this time by flip-flop 103 in the set condition, since output lead INL of flip-flop 103 extends to AND gate 143. With gate 143 blocked, generation of the station poll character, as described hereinafter, is suppressed.

After the cycling of start-stop clock 309 for the suppressed character, character counter 110 is again pulsed, via lead 258, restoring the counter to the initial condition. The start-stop clock also pulses AND gate 161 via lead 258. The output pulse of gate 161 is applied to lead 423 to clear initial flip-flop 103, clear flip-flops 137 to 139 via OR gates 240, 236 and 286 if any one of the flip-flops is set, clear flip-flop 140 and set poll flip-flop 144, FIG. 8, via OR gate 198.

The setting of poll flip-flop 144 prepares the logic circuit to enter the poll state upon the clearing of test poll flip-flop 109. At this time, however, test poll flip-flop 109 remains in the set condition.

The setting of poll flip-flop 144 raises the potential of output terminal "1" and the transition is passed via lead POLL to gate 245. Gate 245 is arranged to pass the transition in the event that the other input is enabled. The other input, at this time, is enabled by WFH flip-flop 185 in the clear condition, thus passing the transition to OR gate 120. The pulsing of OR gate 120 passes a pulse to TRANSFER lead 263. As previously described, this pulse enables transfer gates 319 to transfer the skip table in skip store 318 to main shift register 315.

The pulse from gate 161 also passes through delay unit 171 and OR gate 181 to DELETE lead 264. As previously described, the pulsing of DELETE lead 264 deletes the bit in the first stage of main shift register 315. Thus, with the skip table transferred and the bit removed from the first stage of the main shift register, as previously described, high speed clock 323 is enabled to start after a delay provided by delay unit 171.

When flip-flop 144 is set, an energiing signal is applied to COUNTER lead 424. This applies an enabling signal via COMPARE leads 265 to comparison circuit 317. As previously disclosed, comparison circuit 317 compares the advance of last poll counter 316 with the advance of main binary counter 314 in response to the signal on lead 265 and returns a signal on MATCH lead 266 if they match. If there is no match, inverter 151 inverts the match failure signal on lead 266 to enable AND gate 150. Since the other input to AND gate 150 is enabled by poll flip-flop 144, the gate energizes ENABLE lead 267 via OR gate 152 whereby, as previously described, clock control 322 enables clock 323 to advance counter 314 until a match is obtained with counter 316.

In the initial condition, it may be assumed that both counters 314 and 316 are in an initial matched position. Thus, lead 266 has a match signal thereon. This energizes AND gate 200 which is enabled with poll flip-flop 144 set. Accordingly, GATE lead 268 is energized to enable clock gate 324. As previously described, this connects the high speed clock 323 to last poll counter 316. Thus, last poll binary counter 316, main shift register 315 and main binary counter 314 are advanced by clock 323. It is recalled that gate 161 pulses DELETE lead 264 via relay unit 171. This delay permits the above described match to be obtained. Thereafter, the bit is deleted from the first stage of register 315, clock 323 is thereby started and counters 314 and 316 with register 315 advance until the next bit enters the first stage of main shift register 315 to disable clock control 322 and stop clock 323. Thus, the code of the first station to be polled is stored in last poll binary counter 316.

With flip-flop 144 set, output lead POLL applies enabling potentials to AND gates 146 and 147. Another input to each of AND gates 146 and 147 is energized by inverter 183 via lead 425. Inverter 183, in turn, is operated by way of OR gate 162 by any one of flip-flops 137 to 140 to the clear condition. Finally, output lead POLL of flip-flop 144 pulses OR gate 106 via cable 243, thereby applying a pulse to input terminal "2" of counter 110. Output terminal "a" of counter 110 is therefore energized and start-stop clock 309 again operates. With terminal "a" of counter 110 energized, AND gate 146 is enabled via lead 419. This produces an enabling signal at the output of AND gate 146 to DLE lead 269 via OR gate 398 whereby code "DLE" is coded on write gates 307 via CODE leads 254. In addition, data control 305 is operated via OR gate 208 to extend shift register 308 to data set 302 and WRITE lead 255 is also energized. Thus, character "DLE" is sent to the line.

Near the termination of the generation of character "DLE," start-stop clock 309 pulses terminal "c" of counter 110. This energizes output terminal "b" to initiate a new operation of the start-stop clock. Output terminal "b" of counter 110 also pulses AND gate 147 via lead 421. A pulse is thus passed via lead 280 and OR gate 279 to SPC lead 270. As previously described, the pulse on SPC lead 270 enables last poll counter 316 to code write gates 307 with the station poll code. The pulse on lead 280 is also applied via OR gate 208 to lead 257 and via OR gate 262 to WRITE lead 255 whereby the station poll code is passed by write gates 307, coded on the character shift register and passed by data control 305, to data set 302. In addition, the pulse on lead 280 is passed via OR gate 271 to TIME OUT lead 272, thus starting time out circuit 310. The station polling code character is therefore sent to line 300 and the controller awaits for the response of the remote station.

Assuming now that the remote party line station fails to respond to the station poll character, time out circuit 310 times out and pulses T/O lead 274. This is passed through normally enabled AND gate 179, FIG. 5, via lead 427 to the SET input of T flip-flop 138 and also passed through common lead 243 and OR gate 106 to input terminal "2" of character counter 110. The pulsing of terminal "2" of counter 110 again provides a "two" count operation, in the same manner as previously described, first energizing output terminal "a," which, in turn, starts clock 309. The setting of T flip-flop 138 disables AND gates 146 and 147 via OR gate 162 and inverter 183 and enables AND gate 135 via OR gate 142. Flip-flop 138 also enables AND gate 156 since flip-flop 103 is now in the clear condition. Accordingly, AND gate 131 is enabled.

Since output terminal "a" of counter 110 is energized, AND gate 124 is pulsed via lead 419, pulsing, in turn, AND gate 131 via lead 420. Accordingly, an enabling signal is passed therethrough to output T lead 275, which extends to CODE leads 254 whereby the time out code character is coded on write gate 307. In addition, lead 275 extends via OR gate 262 to WRITE lead 255 and extends via OR gate 277 to lead 276 which, in turn, is connected through common lead 276 to data control 305. The energization of lead 276 operates data control 305 to extend the output of character shift register 308 to typing unit 304. Accordingly, a diagnostic printout is provided to typing unit 304, as previously described, indicating a time out.

At the termination of the generation of the time out character, start-stop clock 309 pulses counter 110. Counter 110 steps, energizing output terminal "b," which, in turn, pulses AND gate 135 which is enabled with T flip-flop 138 and poll flip-flop 144 set. This passes a pulse via lead 422 and OR gate 216 to ANR gate 143, which is now enabled with initial flip-flop 103 in the clear condition. AND gate 143 therefore energizes lead 278 which is connected to SPC lead 270 via OR gate 279, thus extending the station poll code provided by last poll binary counter 316 to write gates 307, as previously described. In addition, lead 276 is enabled via OR gate 277 whereby data control 305 is enabled to extend character shift register 308 to typing unit 304. Lead 278 also pulses lead 255 via OR gate 262 so that typing unit 304 proceeds to record the identity of the station which failed to respond. Finally, AND gate 135 enables AND gate 161. This enabling is sufficiently delayed to occur after the termination of the clock pulse from start-stop clock 309 which had advanced counter 110 to energize output terminal "b," whereby AND gate 161 does not produce a pulse at the output at this time.

At the termination of the printout of the station poll character, start-stop clock 309 produces another pulse which is passed via lead 258 to AND gate 161. AND gate 161, having been previously enabled, passes the clock pulse through delay unit 171 to OR gate 181. This pulses DELETE lead 264, whereby the bit in the first stage of main shift register 315 is deleted. The high speed clock 323 is thus enabled. With poll flip-flop 144 set, COUNTER lead 424 in cable lead 265 is energized to enable comparison circuit 317 to compare counters 314 and 316. The counters, being on the same position, enable comparison circuit 317 to energize MATCH lead 266, as previously described. This enables gate 200 to energize GATE lead 268 whereby, as previously described, both counters 314 and 316 and main shift register 315 advance concurrently until the next bit reaches the first stage of register 315, thereupon stopping clock 323.

The output pulse of AND gate 161 is also provided through lead 423, OR gate 182, FIG. 7, delay unit 180 and lead 428 to AND gate 165. The other two inputs to AND gate 165 extend to lead POLL of poll flip-flop 144 and output terminal "0" of flip-flop 169. Since flip-flop 144 is set and flip-flop 169 is normally clear, AND gate 165 is enabled, passing the pulse through OR gate 166 to input terminal "1" of character counter 110. Accordingly, counter 110 is arranged to provide a one count of the clock pulses from clock 309. Finally, gate 161 clears T flip-flop 138 via OR gate 236.

The pulsing of input terminal "1" of character counter 110 energizes output terminal "b." Accordingly, monopulser 116 operates to start the start-stop clock 309. In addition, output terminal "b" provides an enabling pulse to AND gate 147. With poll flip-flop 144 set and flip-flops 137 through 140 cleared, AND gate 147 is enabled, passing a pulse to lead 280, whereby the station poll code of the next station is coded by last poll counter 316 on write gates 307, the write gates are pulsed to pass the code to register 308, data control 305 is enabled to extend the character shift register to data set 302 and time out circuit 310 is restarted, as previously described. Thus, the next station is polled and the logic circuit awaits the response.

Assume now that a bad response is received from the polled station. This bad response is identified by the failure of the station to respond with any one of the code characters "ACK," "NAK" or "CAN." The response of the remote station is applied to shift register 308 and translated by detection gates 312, as previously described. Gates 312, in response to the character, indicate on DETECT leads 282 the identity of the received character. Thus, if the character is neither "ACK" "NAK" or "CAN," a predetermined lead, shown as $\overline{ACK}$, $\overline{NAK}$, $\overline{CAN}$ lead 283 in FIG. 5, is pulsed. Lead 283 extends to AND gate 172 and, since the other input lead of gate 172 is enabled by lead TP of test poll flip-flop 109 via OR gate 284, R flip-flop 139 is set via OR gate 173 and lead 429. At the same time OR gate 106 is pulsed by gate 172 by way of common lead 243 whereby, as previously described, input terminal "2" of character counter 110 is energized.

The energization of input terminal "2" of character counter 110 energizes output terminal "a," thereby again starting start-stop clock 309, as previously described. With output terminal "a" energized, AND gate 124 is pulsed, pulsing AND gate 132 in FIG. 6. AND gate 132, in turn, is enabled by R flip-flop 139 in the set condition whereby output R lead 285 is energized. Lead 285 extends to CODE leads 254, is connected through OR gate 262 to WRITE lead 255 and extends to OR gate 277 whose output is applied to lead 276 in EXTEND leads 256. Thus, the bad response character "R" is coded on write gates 307 and data control 305 is enabled to extend the shift register 308 to typing unit 304 to record the character, as previously described.

At the termination of the generation of the bad response, character start-stop clock 309 pulses character counter 110 and output terminal "b" becomes energized. This again restarts start-stop clock 309 and enables AND gate 135. The enabling of AND gate 135 pulses AND gate 143. As previously described, the pulsing of AND gate 143 energizes output lead 278, whereby the station poll code from counter 316 is coded on write gates 307 and data control 305 is enabled to extend shift register 308 to typing unit 304, thereby printing the poll code of the station providing the bad response. Finally, AND gate 135 passes an enabling condition to AND gate 161, which condition, as previously described, is sufficiently delayed to occur after the termination of the clock pulse applied to the other input lead of AND gate 161.

At the termination of the generation of the station poll character described above, start-stop clock 309 again pulses lead 258 to restore counter 110. This pulse is also applied to AND gate 161 and passed through delay unit 171 and OR gate 181 to DELETE lead 264 to delete the bit in the first stage of shift register 315. Accordingly, high speed clock 323 is again started, counters 314 and 316 and main shift register 315 advance to the next station to be polled, stopping clock 323.

The pulse through AND gate 161 also is applied through OR gate 286 to reset R flip-flop 139. Finally, gate 161 pulses AND gate 165 via OR gate 182 and delay unit 180. With AND gate 165 enabled by flip-flop 144 set and flip-flop 169 clear, input terminal "1" of counter 110 is again energized by way of OR gate 166, thus initiating the previously described cycle of operations whereby the next station poll code is generated and sent to data set 302.

In the event that the remote station responds to its polling by returning the data character "CAN," indicating improper delivery of the previous message, the reception of this character by register 308 and the translation by detection gates 312 pulses CAN lead 287, which is shown in FIG. 7 extending from DETECT leads 282. The pulse on CAN lead 287 is passed through OR gate 174 to the CLEAR input of test poll flip-flop 109 whereby the flip-flop is cleared. Concurrently, the pulse on CAN lead 287 in FIG. 3 is applied to AND gate 175 and, since AND gate 175 is enabled by way of OR gate 176, which OR gate is connected to lead POLL of poll flip-flop 144, a pulse is passed via gate 175 and lead 430 to the SET input of C flip-flop 137. Accordingly, flip-flop 137 is set.

Returning now to the clearing of test poll flip-flop 109, output lead $\overline{TP}$ extends to the SET input of flip-flop 169, setting this flip-flop. This disables AND gate 165 and enables AND gate 168.

The pulsing of AND gate 175 also passes a pulse via common lead 243 to OR gate 106 and then to input terminal "2" of character counter 110. The pulsing of input terminal "2" of character counter 110 energizes output terminal "a." As previously described, this again starts up start-stop clock 309 and enables AND gate 124. AND gate 124 pulses AND gate 130, which is enabled by C flip-flop 137. This pulses output lead 288 to code the character "C" on write gates 307 via CODE leads 254. In adition, WRITE lead 255 is pulsed via OR gate 262 and a pulse is passed through OR gate 277 to lead 276 which extends to EXTEND leads 256 whereby data control 305 extends the output of character shift register 308 to typing unit 304 and the cancel character "C" is printed.

At the termination of the generation of the character "C," start-stop clock 309 again pulses character counter 110, whereby output terminal "b" is energized. The start-stop clock again starts up and AND gate 135 is enabled. This pulses lead 278 via AND gate 143, whereby the station poll code is printed on the typing unit, as previously described. In addition, AND gate 161 is enabled.

At the conclusion of the generation of the station poll code the start-stop clock again pulses character counter 110, restoring it to its initial condition. The clock pulse on lead 258 also pulses AND gate 161. The pulsing of AND gate 161 again passes a pulse through delay unit 171 and OR gate 181 and thus to output DELETE lead 264. Accordingly, the bit in the first stage of main shift register 315 is deleted and the register, together with counters 314 and 316, is advanced to the next station to be polled. In addition, AND gate 161 pulses AND gate 168 via OR gate 182 and delay unit 180 and, since gate 168 is enabled, a pulse is passed therethrough to clear flip-flop 169 and is passed therethrough to OR gate 106. This energizes input terminal "2" of character counter 110. At this time poll flip-flop 144 is set and flip-flops 109 and 169 are cleared, indicating the termination of the initial test poll state and the advancing of the state logic to the poll state.

Returning now to the responses of the stations in the test poll condition, assume that the remote station answers with the character "NAK" to indicate no message is available. Detection gates respond by pulsing NAK lead 290, shown in FIG. 7 extending from DETECT leads 282. A pulse is thus passed through OR gate 174 to the CLEAR input of test poll flip-flop 109. Test poll flip-flop 109 is thus cleared, setting flip-flop 169, as previously described. This enables AND gate 168 and disables AND gate 165. The application of the pulse to NAK lead 290 pulses delay unit 180 via OR gate 182. Delay unit 180, in turn, pulses AND gates 165 and 168. Since AND gate 168 has been enabled during the delay, a pulse is passed to OR gate 106 and flip-flop 169 is cleared. In addition, NAK lead 290 pulses OR gate 181, passing a pulse to DELETE lead 264. This advances main shift register 315 and counters 314 and 316 to the next station. With OR gate 106 pulsed, input terminal "2" of character counter 110 is energized. At this time poll flip-flop 144 is set and flip-flops 109 and 169 are cleared. This is the previously described initiation of the poll state.

Returning now to the station responses during the test poll state, if the response code character "ACK" is received, indicating a message is available, a pulse is applied to ACK lead 291 in DETECT cable 282 by character detection gates 312. This pulse is passed through OR gate 174, clearing test poll flip-flop 109 which, in turn, sets flip-flop 169. The pulse on ACK lead 291, in addition, is passed to delay unit 180 via OR gate 182. The delayed pulse is then passed to AND gate 168. The pulsing of AND gate 168 clears flip-flop 169 and pulses OR gate 106, thereby energizing input terminal "2" of counter 110. Accordingly, the state logic advances to the poll state, as previously described. Counters 314 and 316 and register 315 are not advanced, however, when an "ACK" is received, so that these circuits are maintained in the position corresponding to the polled station returning the "ACK" character.

POLL STATE

At the initiation of the poll state and the pulsing of input terminal "2" of character counter 110, output terminal "a" is energized. This restarts start-stop clock 309 and pulses AND gate 146. AND gate 146 at this time is enabled, with poll flip-flop 144 set and all of flip-flops 137 to 140 cleared since none of these latter flip-flops applies an enabling signal through OR gate 162 to inverter 183. Accordingly, the energization of output terminal "a" of counter 110 pulses AND gate 146 which, in turn, pulses output lead 269. This codes character "DLE" on write gates 307, pulses the write gates to pass the character to register 308 and enables data control 305 to extend register 308 to data set 302, whereby the code character "DLE" is sent to the line, as previously described.

At the termination of the generation of the character "DLE," start-stop clock 309 pulses counter 110, energizing output terminal "b." This restarts the start-stop clock and pulses AND gate 147, which is enabled with flip-flop 144 set and flip-flops 137 through 140 clear. AND gate 147, in turn, pulses output lead 280. This codes the station poll code from last poll counter 316 on write gates 307, passes the code to shift register 308, enables data control 305 to extend the output of character shift register 308 to data set 302 and starts up time out circuit 310, as previously described. The generation of code character "DLE" followed by the station poll code indicates to the outlying station designated by the poll code that it is being polled for message material. Accordingly, the station will respond by sending an answerback signal or starting the transmitter if a message is available. If a message is available, the first character returned is the start-of-heading character "SOH" or alternatively, "Delete" characters followed by code character "SOH."

Assume first that the polled station fails to respond. After a predetermined interval timeout circuit 310 times out and applies a pulse to T/O lead 274. This pulse is extended via normally enabled AND gate 179 to the SET input of T flip-flop 138, thereby setting the flip-flop. The pulse also is passed via lead 427 through AND gate 170, FIG. 3, and then to OR gate 104, AND gate 170 being enabled by leads $\overline{TP}$, $\overline{HD}$ and $\overline{WFH}$ with test poll flip-flop 109, HD flip-flop 213 and WFH flip-flop 185 all in the clear state at this time. OR gate 104, in turn, pulses OR gate 106 and, in addition, pulses the input SET terminal of major alarm flip-flop 108. The pulsing OR gate 106 energizes input terminal "2" of character counter 110. With major alarm flip-flop 108 set, the major alarm state is initiated in the state logic circuit.

MAJOR ALARM STATE

As previously described, the setting of major alarm flip-flop 108 acts to enable AND gates 112 and 114, write a bit in the first stage of main shift register 315 and concurrently clear the other stages and reset main binary counter 314 to the initial position. In addition, the setting of major alarm flip-flop 108 passes a pulse through lead MA and OR gate 188 to the CLEAR input of poll flip-flop 144, thus resetting this latter flip-flop. The pulsing of OR gate 106 energizes input terminal "2" of character counter 110 and, with major alarm flip-flop 108 set, the initial test poll sequence, comprising the character sequence "ENQ-EOT," is generated and sent to the line in the same manner as previously described.

TEST POLL STATE

With the generation of the character "EOT," major alarm flip-flop 108 is cleared, setting test poll flip-flop 109, as previously described. This places the state logic circuit in the test poll state. The setting of flip-flop 109 pulses character counter 110 by way of OR gate 106. In addition, test poll flip-flop 109 again enables AND gates 124 and 135 by way of OR gate 126. With T flip-flop 138 set by the time out and with flip-flop 103 cleared, AND gate 131 is energized by way of AND gate 156. Accordingly, character counter 110 sequentially pulses AND gates 124 and 135 whereby T lead 275 and SPC lead 278 are sequentially pulsed to send the time out character and the station polling code of the station to typing unit 304. It is noted that this operation is the same as the initializing operation with the exception that flip-flop 103 is now clear, permitting the application of the codes to the typing unit.

As previously described, AND gate 135 also enables AND gate 161. Accordingly, at the conclusion of the generation of the station polling character, start-stop clock 309 pulses AND gate 161, which, in turn, sets poll flip-flop 144 via lead 423 and OR gate 198. The setting of poll flip-flop 144 operates transfer gate 319 to insert the appropriate bits in the main shift register 315, pulses DELETE lead 264 via delay unit 171 and OR gate 181, advances register 315 with counter 314 until a match is obtained with counter 316 and then further advances register 315 with counters 314 and 316 until they advance to the next station to be polled as indicated by a bit in the first stage of register 315. The setting of poll flip-flop 144 also pulses OR gate 106, which, in turn, energizes input terminal "2" of character counter 110. Finally, gate 161, enabled, clears flip-flop 138. Accordingly, character counter 110 is again started up, start-stop clock 309 is restarted and AND gates 146 and 147 are sequentially enabled to generate and transmit code character "DLE" and the station polling code of the next station. Accordingly, the test poll cycle is again repeated by polling each station in the same manner as previously described.

GARBLED CHARACTER RETURNED DURING POLL STATE

Returning now to the polling of the station during the poll state, assume that the station responds with a garbled or incorrect character. This character is neither "NAK," "CAN," "DELETE" nor "SOH." The character is received by register 308 and translated by detection gates 312 which pulse $\overline{\text{DEL}}$, $\overline{\text{NAK}}$, $\overline{\text{CAN}}$, $\overline{\text{SOH}}$ lead 293 shown in FIG. 5 extending from DETECT leads 282. AND gate 189 is therefore pulsed and with test poll flip-flop 109 cleared and poll flip-flop 144 set, AND gate 189 is enabled to pass the pulse to OR gate 173 and then via lead 429 to the SET input of R flip-flop 139. In addition, AND gate 189 passes a pulse by way of lead 431 to OR gate 104 which, in turn, pulses OR gate 106 and the SET input of major alarm flip-flop 108. Accordingly, the state logic goes to the test poll state in the same manner as though a time out occurs. In this event, however, since flip-flop 139 is set rather than flip-flop 138, the diagnostic printout to the typing unit will comprise the bad response code character "R" followed by the station polling character rather than the time out character followed by the station poll character since AND gate 132 is enabled rather than AND gate 131. The initiation and the operation of the test poll cycle is otherwise the same as for a time out.

"CANCEL" CHARACTER RETURNED DURING POLL STATE

If, in the polling cycle, the polled station responds with the character "CAN," indicating a prior improper delivery, character detection gates 312 pulse CAN lead 287 of DETECT leads 282. AND gate 175 is thus pulsed. AND gate 175 is enabled by OR gate 176 which, in turn, is connected to output lead POLL of poll flip-flop 144. The pulsing of AND gate 175 therefore sets C flip-flop 137 via lead 430. In addition, AND gate 175 pulses OR gate 106 via common lead 243. OR gate 106, in turn, energizes input terminal "2" of character counter 110. Since poll flip-flop 144 is set, the energizing of input terminal "2" of character counter 110 provides a "2" character generation by sequentially enabling AND gates 124 and 135.

With C flip-flop 137 set, AND gate 130 is enabled, whereby the diagnostic printout to the typing unit comprises the code character "C" followed by the station polling code. In addition, AND gate 135 enables AND gate 161, as previously described. Accordingly, after the generation of the station polling code, AND gate 161 is pulsed by the start-stop clock, thus passing a pulse through delay unit 171 and OR gate 181 to DELETE lead 264. This deletes the bit in the first stage of register 315 to advance the last poll binary counter 316 together with main binary counter 314 and main shift register 315, as previously described, until another bit advances to the first stage of register 315 to identify the next station to be polled. AND gate 161 also pulses AND gate 165 by way of lead 423, OR gate 182 and delay unit 180. AND gate 165, in turn, energizes input terminal "1" of character counter 110 by way of OR gate 166. Accordingly, the station poll code of the next station is generated, as previously described, thereby polling the next station.

"NO MESSAGE" CHARACTER RETURNED DURING POLL STATE

If, in response to the polling of the remote station, the character code "NAK" is received, indicating that no message is available, character detection gates 312 pulse NAK lead 290 of DETECT leads 282. This pulse is passed to OR gate 181 and to OR gate 182. OR gate 181, in turn, pulses the DELETE lead 264 to advance last poll binary counter 316, main binary counter 314 and main shift register 315 to the next station. OR gate 182, as previously described, pulses AND gate 165 via delay unit 180. AND gate 165, in turn, energizes input terminal "1" of character counter 110 by way of OR gate 166. Accordingly, output terminal "b" of counter 110 enables gate 147 and the main control station proceeds to send the station polling code of the next station.

"WAIT-FOR-HEADING" STATE

If a remote station has a message available the reception of the polling character starts the transmitter thereat. The tape may contain "Delete" characters followed by the start-of-heading code character "SOH," the call-in code characters "CEC" designating the stations of address, the start-of-text character "STX" and then followed by the message test. Alternatively, the first character may comprise the start-of-heading character "SOH" followed by the heading and text.

Assume the first character comprises the "Delete" character code. When the character is received, detection gates 312 pulse DEL lead 294, which extends in FIG. 10 from DETECT leads 282 and extends in FIG. 8 to AND gate 192. With poll flip-flop 142 set and test poll flip-flop 109 cleared, as previously described, AND gate 191 is enabled, energizing in turn, AND gate 192 and AND gate 193 in FIG. 9 via lead 433. The pulse on DEL lead 294 is therefore passed through AND gate 192 to the SET input of WFH flip-flop 185. Flip-flop 185 set pulses OR gates 188 and 227. The pulse applied to OR gate 188 clears poll flip-flop 144. The pulse applied to OR gate 227 is passed to OR gate 271 and then to TIME OUT lead 272, whereupon the operation of time out circuit 310 is started, as previously described. The setting of WFH flip-flop 185 and the clearing of poll flip-flop 144 places the logic circuit in the wait-for-heading state.

Figure 9:
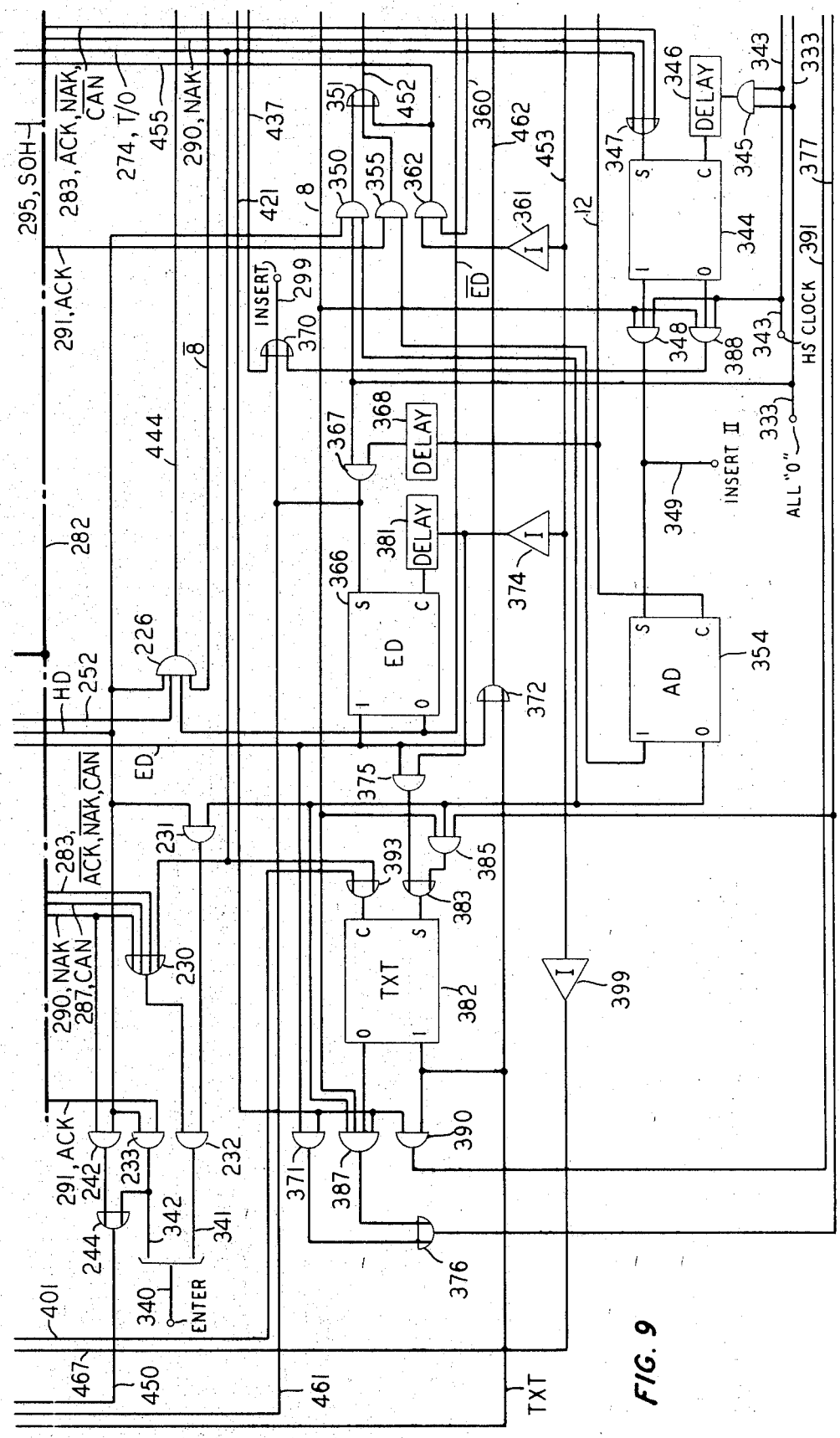

If, however, the first character from the station comprises the start-of-heading code character "SOH," lead 295 which extends in FIG. 9 from DETECT leads 282 is pulsed by character detection gates 312. Lead 295 is connected to AND gates 193 and 196 in FIG. 7. Since, as previously described, AND gate 193 is enabled, the pulse applied thereto is passed to OR gate 197 and then to the SET input of HR flip-flop 195. The pulse provided by OR gate 197 is also applied through lead 434 and OR gate 188 to the CLEAR input of poll flip-flop 144. Thus, poll flip-flop 144 is cleared, HR flip-flop 195 is set and the logic circuit goes to the heading reception state. Therefore, if the first character from the station is the start-of-heading character rather than one or more of the "Delete" characters, the wait-for-heading state is skipped.

Assuming now that a "Delete" character is initially received from the outlying station, WFH flip-flop 185 is set and the logic circuit is in the wait-for-heading state. If another "Delete" character is received, AND gate 192 is again pulsed but, with WFH flip-flop 185 set, no circuit action is performed.

If the outlying station thereafter fails to return any character, time out circuit 310 times out, pulsing T/O lead 274. This lead is extended to AND gate 206 in FIG. 8 and, in addition, to OR gate 106 AND gate 206 is enabled by WFH flip-flop 185 set. The pulsing of OR gate 106 energizes input terminal "2" of character counter 110, starting a two character generation, as previously described. The pulsing of AND gate 206 passes a pulse through OR gate 198 to the SET input of poll flip-flop 144.

AND gate 206 also pulses OR gate 181. This pulse is passed through of DELETE lead 264 whereby the bit in the initial stage of main shift register 315 is removed. High speed clock 323 is thereby started to advance register 315 and counters 314 and 316 until a new bit, designating the next station to be polled, advances to the first stage of register 315, stopping clock 323. The time out therefore restores the poll condition and advances register 315 to the next station. With character counter 110 energized and poll flip-flop 144 set, gates 146 and 147 are sequentially enabled, whereby code character "DLE" and the station poll code of the next station are generated and transmitted. It is noted that the setting of poll flip-flop 144 does not transfer the skip table since gate 245 is disabled, with WFH flip-flop 185 in the set condition. Flip-flop 185 is thereafter cleared via OR gate 186 by the pulse applied to lead 280 to produce the station poll code character.

Return now to the logic circuit in the wait-for-heading state. If the outlying station returns a code character other than the "Delete" character or the start-of-heading character, detection gates 312 pulse $\overline{\text{DEL, SOH}}$ lead 296 which extends from DETECT leads 282 in FIG. 5. This lead is connected to AND gate 199. AND gate 199 is enabled by lead WFH from WFH flip-flop 185. With flip-flop 185 in the set condition, a pulse is passed through gate 199 to lead 435 and then to the SET input of H flip-flop 140. In addition, AND gate 199 pulses OR gate 104 via lead 435. As previously described, the pulsing of OR gate 104 creates a major alarm, setting major alarm flip-flop 108, resetting main binary counter 314, clearing the main shift register and initiating a new test poll sequence. The setting of major alarm flip-flop 108 clears WFH flip-flop 185 by way of lead MA and OR gate 186. During this test poll sequence the start-of-test poll character sequence "ENQ-EOT" is generated, as previously described, and a diagnostic printout is provided for the typing unit. In this case, however, with H flip-flop 140 in the set condition, the first character in the printout is provided by AND gate 133 to H lead 297. This lead extends to CODE leads 254 and extends to OR gates 262 and 277 whereby the bad heading character "H" is coded on the write gates and passed to the typing unit. Thereafter, the station poll code of the station is printed in the same manner as previously described. Finally, the state logic returns to the test poll state wherein the main shift register and the main binary counter are advanced until a match is achieved with the last polled binary counter, the bit in the first stage of the register is deleted and both counters and the register are advanced to the next station to be polled, as previously described. At this time the code sequence "DLE-SPC" is sent to the line, with "SPC" designating the station poll character of the next station. Thereafter, as previously described, a proper response from the station terminates the test poll sequence while an improper response results in a printout and the test polling of the next station. Thus, the reception of an improper character during the wait-for-heading state results in a major alarm, returning the state logic to the test poll state. The state logic thereupon advances to the poll state when a proper response is received from an outlying station.

HEADING RECEPTION STATE

Assume now that, in the wait-for-heading state, the station returns the start-of-heading character "SOH." Character detection gates pulse SOH lead 295 of DETECT leads 282. This pulses AND gate 196, which has been enabled by lead WFH from WFH flip-flop 185. AND gate 196, in turn, passes a pulse through OR gate 197 to the SET input of HR flip-flop 195. The setting of HR flip-flop 195 places the state logic in the heading reception state. It is recalled that if the start-of-heading character is received without the reception of the "Delete" characters, AND gate 193 is pulsed, passing a pulse through OR gate 197 to the SET input of HR flip-flop 195.

With HR flip-flop 195 set, WFH flip-flop 185 is cleared by way of lead HR and OR gate 186. The state logic is now in the heading reception state.

When HR flip-flop 195 is set, AND gates 201 and 204 in FIG. 8 are enabled, as are AND gates 212 and 214 in FIG. 7. The setting of HR flip-flop 195 also pulses COMPARE REGISTER lead 298 of COMPARE leads 265 in FIG. 8 whereby comparison circuit 317 is arranged to compare the binary number code derived from the output of main binary counter 314 with the binary character in register 308. OR gate 209 is also pulsed, whereby, as previously described, main binary counter 314 is reset and register 315 is cleared. In addition, OR gate 227 is plused whereby a pulse is applied via OR gate 271 to lead 272 to restart time out circuit 310. Finally, flip-flop 195 energizes RE-ENTER lead 332, thus enabling re-entrant gate 320 to recirculate bits in the first stage of register 315 to the $n$th stage as the register is advanced.

In the heading reception state the state logic circuit accepts the call-in or address code characters ("CEC") in the heading and inserts bits in the proper stages of main shift register 315. Upon the reception of each call-in code, start-stop clock 309 is started up and the code is entered in register 308. As the conclusion of the reception of the code start-stop clock 309 pulses AND gate 411 in FIG. 8, the gate being enabled by lead HR of flip-flop 195, which lead is connected via OR gate 410 to lead 436. This pulse OR gate 271 to restart time out circuit 310. The clock pulse on lead 258 also pulses AND gate 201 and AND gate 201, being enabled by HR flip-flop 195, as previously described, sets flip-flop 202. Flip-flop 202, in turn, passes an energizing signal through OR gate 152 to ENABLE lead 267. This energizes clock control 322 whereby high speed clock 323 is started up.

High speed clock 323 now concurrently advances main binary counter 314 and main shift register 315. Last poll counter 316 is not advanced since gate 200 is disabled with poll flip-flop 144 cleared. When a match is achieved between main binary counter 314 and shift register 308, a pulse is provided by comparison circuit 317 via MATCH lead 266 to AND gate 204. This passes a pulse via lead 437 and OR gate 370, FIG. 9, to INSERT lead 299 which inserts a bit in the first stage of main shift register 315. Main binary counter 314 and main shift register 315 continue to advance, as previously described, and the bits in register 315 recirculate back through gate 320 until the register and the counter have stepped through all the stages being utilized. Thereupon, main binary counter 314 is reset, as previously described. The reset condition is detected by detector 326 and a pulse is passed to the CLEAR input of flip-flop 202 via ALL "0" lead 333. This stops clock 323 and counter 314 and register 315 are now back in the initial position. Register 315, however, has a bit inserted in the stage corresponding to the call-in code character in the message heading. The state logic circuit now awaits the reception of the next call-in code, whereupon the process is repeated. It is noted that, if a "Delete" character is received, the above operations are also provided. In this case, however, the binary number corresponding to the "Delete" code is greater than the maximum count of counter 314. Thus, no match is achieved and no bit inserted in register 315.

In the event that the station fails to send the call-in codes, a time out occurs, AND gate 179 is pulsed, as previously described, and T flip-flop 138 is set. In addition, AND gate 170 is pulsed, passing a pulse to OR gate 104. Accordingly, a major alarm is created and a new test poll sequence is started. With the setting of major alarm flip-flop 108, HR flip-flop 195 is cleared by lead MA via OR gate 211.

If, during the heading reception state, an improper response is received, which response comprises a code character which is neither a "Delete" character, a "call-in" ("CEC") character or a start-of-test ("STX") character, then detection gates 312 pulse $\overline{CEC}$, $\overline{DEL}$, $\overline{STX}$ lead 334, shown in FIG. 5, extending from DETECT leads 282. Lead 334 applies a pulse to AND gate 203. Since AND gate 203 is enabled by HR flip-flop 195 in the set condition, the pulse is passed by way of lead 435 to the SET input of flip-flop 140 and to OR gate 104. This sets up the previously described major alarm situation whereby the bad heading character is printed with the station code, followed by the initiation of a new test poll cycle.

HEADING DELIVERY STATE

With the state logic in the heading reception state, the reception of the start-of-text code character "STX" from the remote station terminates the heading and indicates the initiation of the message text. At this time the outlying station stops transmitting and awaits an "STX" response from the line controller to restart the transmitter for delivery of the message text.

When the start-of-text character "STX" is received, detection gates 312 pulse STX lead 335, which extends in FIG. 7 from DETECT leads 282. Lead 335, in turn, pulses AND gate 212. With AND gate 212 enabled by HR flip-flop 195, a pulse is passed therethrough to set HD flip-flop 213. In addition, the pulse from AND gate 212 is applied through lead 438 and OR gate 166 to input terminal "1" of character counter 110, preparing the counter for a "one" count. This, as previously described, energizes output terminal "b," which, in turn, starts up start-stop clock 309.

With HD flip-flop 213 set and HR flip-flop 195 also set, AND gate 214 is enabled, enabling, in turn, AND gate 217, FIG. 5, by way of lead 439. Thus, the energization of output terminal "b" of character counter 110 passes an enabling signal through lead 421, AND gate 217, lead 440 and OR gate 216 to AND gate 143. With AND gate 143 enabled with initial flip-flop 103 in the clear condition, a pulse is passed to lead 278, whereby, as previously described, the station polling code of the station is printed by typing unit 304. In addition, the output of AND gate 143 is passed to AND gate 218 in FIG. 7. AND gate 218, having been previously partially enabled by the setting of HD flip-flop 213, is now fully enabled by gate 143 to pass the next clock pulse on lead 258.

After the generation of the station polling code, clock 309 pulses lead 258, which pulse restores counter 110 and is also applied through AND gate 218 and OR gate 211 to the CLEAR input of HR flip-flop 195. The pulse is also passed via lead 441 to OR gate 106 and thus to input terminal "2" of character counter 110. This prepares character counter 110 for a "two" count operation, energizing output terminal "a" and restarting the start-stop clock. The logic circuit is now in the heading delivery state.

With HR flip-flop 195 cleared and HD flip-flop 213 set, AND gate 221 is enabled. This passes an enabling signal via lead 442 to AND gate 224 and, via OR gate 386, to AND gate 223 in FIG. 3. AND gate 223 is fully enabled at this time by output lead 425 of inverter 183 since all of flip-flops 137 to 140 are in the clear condition. Thus, the enabling signal from output terminal "a" of character counter 110 is applied through AND gate 223 and passed by way of OR gate 225 to ENQ lead 252. This generates the character code "ENQ," as previously described, sending the code to output line 300. The output of AND gate 223 is also applied to OR gate 277 via lead 443, whereby the character "ENQ" is printed by typing unit 304.

And gate 226, FIG. 9, is enabled at this time by the signal applied to lead 252 by OR gate 225, by lead HD with HD flip-flop 213 in the set condition, by lead $\overline{ED}$ with ED flip-flop 366 in the clear condition and by lead $\overline{8}$ which is normally enabled by alternate delivery counter 352, FIG. 10, as described hereinafter. Accordingly, AND gate 226 pulses DELETE lead 264 via lead 444 and OR gate 181, removing the bit in the initial stage of main shift register 315. Register 315, together with main binary counter 314, thus advances to the stage having the next bit, which stage corresponds to the first station to be called.

At the conclusion of the generation of code character "ENQ," start-stop clock 309 pulses character counter 110, which energizes output terminal "b." This pulses AND gate 224. AND gate 224 is enabled, at this time by the signal applied to lead 442 by gate 221. Thus, AND gate 224 energizes CEC lead 337 via lead 336 and OR gate 384. CEC lead 337 extends the output of main binary counter 314 to write gates 307. Lead 337 also pulses OR gates 62 and 277, whereby the write gates code shift register 308 with the call-in code of the first addressee station and, in addition, data control 305 is enabled to extend the output of character shift register 308 to typing unit 304, as previously described, whereby the station call-in code is printed. AND gate 224 also pulses AND gate 338, FIG. 8, AND gate 338 being enabled by inverter 183. AND gate 338 pulses OR gates 208 and 271. With this pulsing, as previously described, the code is also sent to data set 302 and on to line 300 and time out circuit 310 is operated to time the response of the outlying station. The main station now awaits the response of the addressee station.

Assume first that the remote station fails to respond to the call-in code. Time out circuit 310 pulses T/O lead 274, thereby setting T flip-flop 138, as previously described. In addition, OR gate 106 is pulsed and, as previously decribed, character counter 110 is arranged for a "two" count. The pulse on T/O lead 274 is also applied through OR gate 230 in FIG. 9 to AND gate 232. AND gate 232 is enabled by AND gate 231. AND gate 231, in turn, is enabled by lead HD with flip-flop 213 set and by lead $\overline{AD}$ with AD flip-flop 354 cleared. Accordingly, AND gate 232 pulses lead 341 of ENTER leads 340, whereby entering a bit in the final stage of main shift register 315, as previously described, thus simulating the recirculation of the bit in the first stage.

The pulsing of OR gate 106 energizes output terminal "a" of character counter 110, which, in turn, pulses AND gate 124. AND gate 124 is enabled by way of OR gate 228 by lead HD of HD flip-flop 213 in the set condition. This enables AND gate 131 via lead 420, whereby the time out character is delivered to the typing unit, as previously described.

At the conclusion of the generation of the time out character, terminal "b" of character counter 110 is energized, enabling AND gate 224. Since AND gate 224 is enabled, as previously described, an enabling signal is passed to CEC lead 337. This codes character shift register 308 with the addressee station call-in code derived from main binary counter 314, and, further, enables data control 305 to extend the character register to the typing unit. Thus, the time out character and the code of the station failing to respond is printed.

After the generation of the call-in code, start-stop clock 309 pulses lead 258, restoring counter 110 and pulsing AND gate 235 in FIG. 4. This AND gate is enabled by lead 337 and therefore passes the clock pulse via lead 447 and OR gate 236 to the CLEAR input of flip-flop 138. The resetting of T flip-flop 138 provides a pulse through lead T and OR gate 238, FIG. 4, and lead 448 to A.C. gate 239, in FIG. 3, this gate being arranged to pass a pulse transition on lead 448 when enabled. Gate 239 is enabled by lead HD of HD flip-flop 213 in the set condition. Accordingly, the pulse on gate 239 is passed through OR gate 106 to input terminal "2" of counter 110, restarting the generation of another "two" character sequence.

For the generation of the first character, output terminal "a" of character counter 110 is energized, enabling AND gate 223. Accordingly, an enabling signal is passed through OR gate 225 to ENQ lead 252. The character "ENQ" is therefore sent to the line, as previously described. In addition, gate 223 pulses OR gate 277, whereby the character "ENQ" is passed to the typing unit. Finally, AND gate 226 is enabled by lead 252, thereby deleting the bit in the first stage of main shift register 315. Accordingly, high speed clock 323 starts up, as previously described, advancing counter 314 and register 315 until the next bit advances to the first stage. This corresponds to the next station of address.

If the outlying station responds to its call-in code with the cancel character "CAN," indicating the previous message was improperly received, detection gates 312 pulse CAN lead 287 of DETECT leads 282. This pulse is passed through OR gate 230 in FIG. 9 to AND gate 232 and then to lead 341 of ENTER leads 340, whereby a bit is entered in the final stage of main shift register 315. In addition, AND gate 175, which is enabled by lead HD of HD flip-flop 213 via OR gate 176, passes the pulse on lead 287 to lead 430, setting C flip-flop 137. AND gate 175 also pulses OR gate 106. With the setting of flip-flop 137 a diagnostic printout is provided, in the same manner as previously described with respect to the setting of flip-flop 138. In this case, however, the printout comprises the printing of the cancel character "C" rather than the time out character. This is then followed by the generation of the call-in code which is applied to the typing unit, as previously described. After the generation of the call-in code, C flip-flop 137 is reset by way of AND gate 235, lead 447 and OR gate 240. The resetting of C flip-flop 137 pulses A.C. gate 239 via lead C, OR gate 238 and lead 448, pulsing, in turn, OR gate 106. Character counter 110 now sets up another "two" character sequence comprising the code sequence "ENQ" and the call-in code character of the next station, since, upon the generation of the code character "ENQ" the bit is deleted from the first stage of main shift register 315, as previously described.

Assume now that a bad response is received from the polled outlying station, which response is none of the characters "ACK," "NAK" nor "CAN." In this event, detection gates 312 pulse $\overline{\text{ACK, NAK, CAN}}$ lead 283 in FIG. 5. This pulse is applied to AND gate 172 which is enabled by lead HD of HD flip-flop 213 via OR gate 284. AND gate 172, in turn, sets R flip-flop 139 via OR gate 173 and lead 429. AND gate 172 also pulses OR gate 106 via common lead 243. The pulse on lead 283 is also passed through OR gate 230 and AND gate 232 to lead 341 of ENTER leads 340. Accordingly, a bit is entered in the final stage of register 315 and a diagnostic printout is provided, in the same manner as previously described with respect to the setting of flip-flop 138. In this case, however, the printout comprises the printing of the bad response character "R," with R flip-flop 139 set, rather than the time out character. This is then followed by the generation of the call-in code which is applied to the typing unit. Thereafter, flip-flop 139 is cleared by AND gate 235 via lead 447 and OR gate 286. The resetting of flip-flop 139 pulses A.C. gate 239 via lead R, OR gate 238 and lead 448, pulsing, in turn, OR gate 106. This sets up another two character sequence comprising the character "ENQ" followed by the call-in code of the next station, since, upon the generation of "ENQ," the bit is deleted from the first stage of register 315, as previously described.

If the outlying station responds to its call-in code with the character "NAK," indicating that it is not available to receive, character detection gates 312 pulse NAK lead 290. This is passed to OR gate 230 which pulses AND gate 232. A pulse is thus passed to lead 341 of ENTER leads 340 which enters a bit in the final stage of main shift register 315. In addition, NAK lead 290 pulses AND gate 242. AND gate 242, in turn, is enabled by lead HD of HD flip-flop 213. Therefore, AND gate 242 passes the pulse through OR gate 244 and lead 450 to OR gate 106. Thus a new two character sequence is generated, sending to the line the character "ENQ" and the call-in character of the next station.

If the outlying station is prepared to receive, it returns the code character "ACK." In response to this code character, the character detection gates pulse ACK lead 291, pulsing, in turn, AND gate 233. AND gate 233 is enabled by lead HD of HD flip-flop 213, whereby output lead 342 of ENTER leads 340 is energized. This enters a "0" bit in the final stage of main shift register 315, thereby blocking the simulated recirculation of the bit corresponding to the addressee station. In addition, AND gate 233 applies a pulse to OR gate 106 by way of OR gate 244 and lead 450. Thus, the code sequence calling the next addressee station is produced.

The main station line controller continues to call the subsequent addressee stations as indicated by the bits entered in the stages of main shift register 315. Diagnostic printouts are provided for each bad response or time out, a bit is entered in the final stage of main shift register 315 for any bad response time out or "NAK" response to stimulate a recirculation, and the final stage is cleared for any "ACK" responses to simulate blocking the recirculation. Thus, all of the addressee stations are called until main shift register 315 is advanced through all its stages. Concurrently, of course, main binary counter 314 is advanced through all its corresponding positions (designated here as "$n$" positions). Upon main binary counter 314 being advanced to the next, or $n+1$ position, $n+1$ detector 327 is operated to reset main binary counter 314. Since main shift register 315 has $n$ intermediate stages, it is completely recirculated, as previously described, when main binary counter 314 is reset. Upon the resetting of main binary counter 314, all-"0" detector 326 is energized, pulsing, in turn, ALL-"0" lead 333. This pulse is passed in FIG. 9 to AND gate 350 in state logic 301.

At this time AND gate 350 is enabled by lead HD with HD flip-flop 213 in the set condition and lead $\overline{\text{AD}}$ with AD flip-flop 354 in the clear condition. Accordingly, the pulse on lead 333 is passed through AND gate 350, OR gate 351 and lead 452 to the STEP input of alternate delivery counter 352 in FIG. 10.

Alternate delivery counter 352 comprises a conventional binary counter having the capability of providing thirteen counts. A pulse applied to the input STEP terminal functions to advance the alternate delivery counter 352 one position or count. A pulse applied to input clear terminal "c" clears counter 352 to the initial position. The output leads of counter 352 are energized in accordance with the various counts or positions of the counter. The output lead designated "8" is enabled when the counter advances to the count of eight, while output lead designated "12" is energized when the counter advances to the count of twelve. Similarly, the output lead designated "9, 10, 11" is energized when the counter has advanced to one of the corresponding counts. Alternatively, output lead $\overline{8}$ is normally energized except when counter 352 has advanced to the count of eight.

Summarizing the above described operations, each of the addressee stations is called when main shift register 315 advances to the bit corresponding to the addressee station, the bit being recirculated if the addressee station is not ready to receive and being discarded if the station responds with the character "ACK," designated that it is ready to receive a message. Each station, therefore, is called until main shift register 315 completely recycles and main binary counter 314 recycles and is reset, whereupon alternate delivery counter 352 is advanced one count. Thus, the addressee stations are called and main shift register 315 is cycled, as is main binary counter 314.

Alternate delivery counter 352 is advanced until eight cycles are completed, whereupon counter 352 advances to the count of eight.

ALTERNATE DELIVERY STATE

Assume now that, during the previously described calling of the addressee stations, at least one station has failed to respond that it is ready to receive (the station, of course, being called eight times). In that event the station has failed to respond, providing a time out, or has responded with a bad character, or, alternatively, has responded with the character "NAK." In these above three cases either lead 274, 283 or 290 is pulsed, as previously described. The pulse on any one of these leads is passed through OR gate 347 in FIG. 10 to the SET input of flip-flop 344, whereupon this flip-flop is set. It is noted at this time that ALL-"0" lead 333 is connected to the input of AND gate 345 which, in turn, extends by way of delay unit 346 to the CLEAR input of flip-flop 344. Since the other input of AND gate 345 extends to lead 343 which, in turn, is connected to high speed clock 323, it is apparent that flip-flop 344 is cleared by the clock pulse each time counter 314 advances to its final position and is reset to its initial position. Delay unit 346 functions to permit concurrent operations, as described hereinafter. In any event, as the eighth count is being concluded, flip-flop 344 is set with at least one station not returning the code character "ACK."

With flip-flop 344 set AND gate 348 is enabled after eight cycles of calling, since another input to AND gate 348 extends to output lead 8 of alternate delivery counter 352. Accordingly, the next pulse from high speed clock 323, occurring after the resetting of main binary counter 314 advances counter 352 to the count of eight, is passed by way of lead 343 through AND gate 348 to INSERT II lead 349. At this time, of course, main shift register 315 is back to its initial position. Thus, in this position, the pulsing of output lead 349, as previously described, inserts a bit in the second stage of main shift register 315. This permits main shift register 315 to advance one step, stopping at the position corresponding to the first station, which is designated the alternate delivery station. At the same time the pulse on lead 349 sets AD flip-flop 354. State logic 301 is now in the alternate delivery state.

It is recalled that when a response is returned from a called addressee station, OR gate 106 is pulsed to initiate the generation of the code character "ENQ." This, of course, had occurred when the last addressee station was called. Accordingly, the code character "ENQ" is transmitted in the same manner as previously described and then, with main shift register 315 advanced to the position corresponding to the alternate delivery or intercept station, the code character of that station is generated and transmitted. At this time, with AD flip-flop 354 in the set condition, AND gate 355 is enabled and the line controller awaits the response from the alternate delivery station. It is noted that, with alternate delivery counter 352 advanced to the count of eight, AND gate 226 is disabled by output lead 8 on counter 352. Accordingly, upon the generation of the character "ENQ," the pulse on lead 252 is blocked by gate 226, precluding the deleting of the bit in the first stage of main shift register 315. Thus, register 315, together with counter 314, is maintained in the same position. Accordingly, if the alternate delivery station fails to respond or responds with a bad response or the character "CAN," the customary diagnostic printout is provided. This is followed by another calling code sequence, "ENQ-CEC," as previously described, but with the "CEC" designating the same or alternate delivery station. If a "NAK" response is returned, gate 242 is pulsed to initiate another calling sequence, as previously described. In either event, the alternate delivery station is immediately called back and repeatedly called until the answering character "ACK" is received, indicating the station is ready to receive.

When the main station receives the character "ACK," detection gates 312 pulse ACK lead 291, as previously described. This pulses gate 233 to initiate the generation of a two character sequence, as previously described. In addition, since AND gate 355 is enabled by AD flip-flop 354, the pulse on lead 291 is passed through the gate and through OR gate 351 and lead 452 to the STEP input of alternate delivery counter 352. This advances counter 352 to the count of nine.

The advance of counter 352 to the count of nine energizes lead "9, 10, 11." This passes a pulse to the CLEAR input of HD flip-flop 213 via lead "9, 10, 11" and OR gate 460 to clear the flip-flop. In addition, lead "9, 10, 11" partially enables AND gate 358. The second input to gate 358 extends via lead 425 to inverter 183, which further enables gate 358 since, with the "ACK" code response, none of flip-flops 137 through 140 is set. Finally, with a new two character sequence initiated, character counter 110 first energizes output terminal "a" and then output terminal "b." These signals are thus applied via leads 419 and 421, respectively, and OR gate 360 to fully enable AND gate 358.

The enabling of gate 358 energizes DEL lead 360 and enables AND gate 362, FIG. 9. DEL lead 360 extends by way of CODE leads 254 to code the write gates with the code character "Delete." Lead 360 also extends to WRITE lead 255 by way of OR gate 262 and to lead 257 by way of OR gate 208. Accordingly, as previously described, the character coded on write gates 307 is applied to character shift register 308 and then passed under control of data control 305 to data set 302 and then to line 300. Since, when the code character "ACK" was received character counter 110 was enabled for a two character count by way of AND gate 233, OR gate 244 and OR gate 206, the above described generation and transmission of the code character "Delete" is repeated.

At the termination of the generation of the two characters, output terminal "a" and output terminal "b" of character counter 110 are both low, providing a low condition transition at the output of OR gate 360. This low condition transition is passed by lead 453 and inverter 361, FIG. 9, to AND gate 362, thus pulsing AND gate 362. It is noted that though gate 358 becomes disabled when the output of OR gate 360 falls, gate 362 is provided with sufficient inherent delay to remain enabled long enough to pass the pulse from inverter 361.

The output pulse of AND gate 362 is passed through OR gate 351 and lead 452 to again step alternate delivery counter 352, thus advancing the counter to the tenth position. At the same time AND gate 362 pulses OR gate 106, by way of lead 455, whereby character counter 110 is reset to again initiate the generation of a two character count. With counter 352 in the tenth position AND gate 358 remains enabled and the above described cycle of operation for generating the two "Delete" characters is repeated. At the termination of the generation of these characters, AND gate 362 is again enabled, alternate delivery counter 352 advances to the count of eleven and OR gate 106 is again pulsed, whereby another two "Delete" characters are generated and transmitted to the line.

Summarizing the above operations, it is seen that six "Delete" characters are generated and transmitted to provide a "leader" or data interval in the message tape to precede the message heading and text to be delivered to the alternate delivery station.

After the generation of the six "Delete" characters, alternate delivery counter 352 advances to the count of twelve, lead "9, 10, 11" is de-energized and AND gate 358 is disabled. At this time output lead 12 of counter 352 is enabled, providing a pulse to the CLEAR input of AD flip-flop 354.

With output lead 12 of alternate delivery counter 352 in the enabled condition, AND gate 359 is paritally enabled. A second input lead extends from the output of inverter 183 by way of lead 425, it being recalled that inverter 183 generates an enabling potential at the output thereof when all of flip-flops 137 through 140 are in the clear condition, and these flip-flops are all presently clear. Accordingly, AND gate 359 is fully enabled and will provide a pulse at the output when output terminal "a" of character counter 110 goes high to pulse lead 419.

Since the advance of counter 352 was provided by the output of AND gate 362 and since gate 362 also pulsed OR gate 106, character counter 110 is again placed in the two character generation condition. Thus, output terminal "a" does go high and gate 359 pulses SOH lead 364. Output lead 364 extends via CODE leads 254 to code write gates 307 with the start-of-heading character "SOH." Lead 364 also extends to OR gate 262 and OR gate 208. Accordingly, as previously described, the character coded on write gates 307, namely the start-of-heading character "SOH," is passed to shift register 308 and data control 305 is enabled to pass the character to data set 302 and then to line 300.

After the generation and transmission of the start-of-heading ("SOH") character, start-stop clock 309 pulses character counter 110, thereby energizing output terminal "b." This pulses AND gate 363 via lead 421. AND gate 363 is enabled at this time since the other input is connected to output lead 12 of counter 352. Accordingly, at this time AND gate 363 energizes inverter 369 which, in turn, disables AND gate 259 via lead 459. Thus, start-stop clock 309 is hereafter precluded from pulsing character counter 110.

When output terminal "b" of character counter 110 goes to the high condition, AND gate 365 is partially enabled since one input lead extends to lead 421. Another input lead is connected to output lead 12 of counter 352, and a third input lead extends to lead $\overline{ED}$ of ED flip-flop 366, which flip-flop is presently clear. Accordingly, AND gate 365 is enabled and the clock pulse on lead 258 which advanced character counter 110 and thus enabled output terminal "b" is passed through AND gate 365, lead 458 and OR gate 181 to pulse DELETE lead 264, which, as previously described, deletes the bit in the first stage of main shift register 315. Accordingly, register 315 is advanced with counter 314 until the next bit enters the first stage of register 315. This bit corresponds to the first addressee station which has not responded with the code character "ACK."

With output terminal "b" of counter 110 in the high condition, AND gate 380 is enabled since the other input is connected to lead 12 of counter 352. This energizes CEC lead 337 via AND gate 380, lead 445 and OR gate 384. As previously described, the enabling of CEC lead 337 functions to generate and transmit to the line the call-in or address code character of the station corresponding to the bit in main shift register 315. At this time, as previously described, this character is being printed by the alternate delivery station. Thus, the call-in character of the station failing to respond "ACK" is printed and recorded by the alternate delivery station.

At the termination of the generation of the call-in character, start-stop clock 309 again pulses lead 258. In this case, with AND gate 259 disabled, character counter 110 is not advanced. AND gate 365 is again pulsed by the clock pulse on lead 258, deleting the bit in the first stage of register 315. Register 315 and counter 314 thus advance to the next addressee station which did not return an "ACK" response. Accordingly, this next station's call-in code is transmitted and printed by the alternate delivery station in the same manner as previously described with respect to the prior station. This cycle is repeated until all the call-in codes of the stations not responding that they are ready are transmitted. Thereupon, register 315 advances back to the initial position and counter 314 advances to the final position. Counter 314 is reset and a pulse is applied to ALL-"0" lead 333. The pulse on lead 333 is passed to AND gate 367, FIG. 10, which gate is enabled by output lead 12 of counter 352 by way of delay unit 368. AND gate 367 being enabled, sets ED flip-flop 366. This advances the state logic to the end delivery state.

END DELIVERY STATE

The enabling of AND gate 367 pulses OR gate 260 via lead 461. This, in turn, pulses character counter 110, thus clearing it to its initial condition since it is presently on its second step. At the same time AND gate 367 pulses OR gate 106 and character counter 110 goes to the two character generation condition. Finally, AND gate 367 pulses gate 370, thus passing a pulse to INSERT lead 299. As previously described, the pulsing of lead 299 writes a bit in the first stage of main shift register 315 to stop the operation of clock 323. Register 315 and counter 314 are thus stopped in their initial positions.

With ED flip-flop 366 set, alternate delivery counter 352 is cleared by way of OR gate 372 and lead 462. In addition, AND gate 223 is partially enabled by lead ED by way of OR gate 386. The energization of terminal "a" of character counter 110 now enables AND gate 223 since lead 425 extending from the output of inverter 183 is high. Accordingly, AND gate 223 pulses ENQ lead 252 by way of OR gate 225. Thus, the code character "ENQ" is generated and transmitted to the outgoing line.

At the termination of the generation of the character "ENQ," start-stop clock 309 pulses lead 258, advancing character counter 110 to the second count, which energizes output terminal "b." With output terminal "b" of character counter 110 energized, AND gate 371 is enabled via lead 421 since the other input extends to lead ED of ED flip-flop 366. AND gate 371 pulses OR gate 376, pulsing, in turn, DC lead 377.

The pulsing of DC lead 377 energizes write gates 307 by way of CODE leads 254 to code the device control character "DC" on the write gates. In addition lead 377 pulses OR gate 262 and OR gate 208, whereby the "DC" character is passed to shift register 308 and then is applied by data control 305 to data set 302 to be passed to line 300. This, as previously described, enables the selected addressee stations to print the subsequently received data message.

At the termination of the generation of th "DC" code character start-stop clock 309 pulses lead 258, resetting character counter 110. This removes the energization of output terminal "b," lowering the potential applied through OR gate 360 and lead 453 to inverter 374 in FIG. 9. Accordingly, inverter 374 applies an enabling potential to AND gate 375 and to delay unit 381. Considering first AND gate 375, the other input thereto is enabled by lead ED of ED flip-flop 366. AND gate 375 therefore sets TXT flip-flop 382 by way of OR gate 383. Thereafter, the energizing potential applied to delay unit 381 clears ED flip-flop 366. With TXT flip-flop 382 set, state logic 301 is in the text state. The main station is now in condition to monitor the incoming text.

In the event that all addressee stations respond with the code character "ACK" during the heading delivery state, flip-flop 344 is not set, since, prior to the eighth cycle, all stations have responded with the code character "ACK" whereby no stations are called during this cycle or during the eighth cycle, the remaining station or stations respond with the code character "ACK." In either event, OR gate 347 is not pulsed and flip-flop 344 is maintained in the clear condition. In this condition AND gate 348 is not enabled and AD flip-flop 354 remains in the clear state. Consequently, lead 349 is not energized to write a bit in the second stage of main shift rgeister 315. Instead, AND gate 388 is enabled when alternate delivery counter 352 steps to the eighth count. This passes the clock pulse on lead 343 through gate 388 and OR gate 370 to INSERT lead 299, inserting a bit in the first stage of register 315. This stops register 315 and counter 314 in their initial positions.

It is recalled that the code character "ENQ" is normally generated and transmitted after the call-in code character of each station is transmitted. Accordingly, since it is presumed that the last station responds with the character "ACK," this code character "ENQ" is generated and, during the generation, high speed clock 323 has advanced register 315 and counter 314 through the eight cycles. Alternate delivery counter 352 at this time energizes output lead 8. This enables gate 388, as described above, and, further, partially enables AND gate 387. Gate 387 is further enabled by lead $\overline{AD}$ from AD flip-flop 354 and by TXT flip-flop 382 in the clear condition.

After the generation of the code character "ENQ," start-stop clock 309 advances counter 110. Output terminal "b," therefore, provides a high output via lead 421 to AND gate 387. AND gate 387 passes the pulse through OR gate 376 to DC lead 377. This provides the generation of code character "DC," as previously described. In addition, lead 377 enables AND gate 385 since AD flip-flop 354 is in the clear condition, and counter 352 is still energizing output terminal lead 8. AND gate 385 sets TXT flip-flop 382 by way of OR gate 383. The setting of TXT flip-flop 382 places the state logic in the text state, as previously described, whereby the main station awaits the delivery of the text from the calling station.

TEXT STATE

With TXT flip-flop 382 set, alternate delivery counter 352 is cleared by way of OR gate 372. In addition, HD flip-flop 213 is cleared via OR gate 460, if the flip-flop was not previously cleared in the alternate delivery state. In addition, OR gate 166 is pulsed, via lead TXT, thus setting character counter 110 to a one character count. This energizes output terminal "b" of character counter 110. This passes an energizing signal via lead 421 to AND gate 390, which is enabled by TXT flip-flop 382 in the set condition. Accordingly, gate 390 enables STX lead 391, applying the code character "STX" to write gates 307 by way of CODE leads 254. Lead 391 also pulses OR gate 262 and OR gate 208 to send the code character "STX" to line 300. Finally, lead 391 pulses OR gate 271 to start time out circuit 310. The calling station, in response to the code character "STX," now proceeds to send the message text. It is noted that, during the text, each clock pulse on lead 258 is passed to AND gate 411, which is enabled by TXT flip-flop via OR gate 410. Since each pulse through AND gate 411 restarts time out circuit 310 and each incoming character resets the timer, a time out will occur if there is a message interruption.

Assume now that, with state logic 301 in the text state, the incoming message is interrupted before the end-of-transmission code "EOT" is received. In this event, start-stop clock 309 fails to recycle time out circuit 310. Time out circuit 310 thus pulses T/O lead 274. This pulse is passed by way of OR gate 393 to clear TXT flip-flop 382. In addition, the pulse on lead 274 is applied to AND gate 179. Accordingly, T flip-flop 138 is set and a pulse is passed through AND gate 170 to OR gate 104, whereby, as previously described, state logic 301 is placed in the major alarm condition. Thus, the main station provides the diagnostic printout and returns to the test poll state.

At the conclusion of the message text, the end-of-transmission character "EOT" is received from the sending station. This character is received on shift register 308 and diagnosed by detection gates 312. Gates 312, in turn, pulse EOT lead 394 in DETECT leads 282. The pulse on lead 394 is applied to AND gate 395 in FIG. 5. AND gate 395, in turn, is enabled by lead TXT with TXT flip-flop 382 in the set condition. Accordingly, AND gate 395 pulses OR gate 166 via lead 464, setting character counter 110 to the one character generation condition. In addition, flip-flop 396 is set. The setting of flip-flop 396 energizes INHIBIT lead 401 and clears TXT flip-flop 382 by way of lead 401 and OR gate 393.

As previously described, the energizing of INHIBIT lead 401 enables data control 305 to block incoming data signals received by data set 302 from line 300. Thus, at this time the main station line controller is blinded to incoming signals. In addition, flip-flop 396 enables AND gate 397 in FIG. 7. With character counter 110 set to the one character generation condition, output terminal "b" goes to the high condition and this condition is also applied via lead 421 to AND gate 397. Thus, AND gate 397 pulses OR gate 398 via lead 466 and this pulse is passed through to DLE lead 269. As previously described, the pulsing of DLE lead 269 provides the generation and transmission of the code character "DLE."

At the termination of the generation of the code character "DLE" start-stop clock 309 restores character counter 110. This brings down the potential of output terminal "b," lowering, in turn, the potential on the output of OR gate 360. In response thereto, inverter 399 in FIG. 9 passes an enabling potential through lead 467 to AND gate 400. The line controller now awaits the cessation of signaling from the transmitting station.

IDLE LINE STATE

After the transmission of code character "EOT" the outlying station may continue to transmit any leader characters, such as the "Delete" characters that may remain in the transmitter. After the transmission of these characters, however, the incoming signals on line 300 cease. The output of the receive side of data set 302 becomes idle and this idle condition is passed to idle line timer 403. In the event that the line remains idle for a predetermined interval of time, idle timer 403 times out, pulsing IDLE lead 392 which extends to AND gate 400. This pulse is passed by AND gate 400 to set IL flip-flop 404. State logic 301 thus goes to the idle line state. With IL flip-flop 404 set, flip-flop 396 is cleared. In addition, flip-flop 404 pulses OR gates 198 and 166 via lead IL. The pulsing of OR gate 166 places character counter 110 in the one character generation condition. Concurrently, the pulsing of OR gate 198 sets poll flip-flop 144, as previously described. With poll flip-flop 144 set and character counter 110 placed in the one character generation state whereby output terminal "b" is energized, AND gate 147 is enabled. Thus, as previously described, state logic 301 is placed in the poll state in preparation of generating the station poll code character. It is noted that character "DLE" was previolsly generated to provide the appropriate two code sequence for the polling code. It is further noted that with state logic 301 placed in the poll condition, A.C. gate 245 is pulsed and the skip table is again inserted in main shift register 315. In addition, with poll flip-flop 144 set, COUNTER lead 424 is enabled, together with gates 200 and 150, whereby register 315 and counter 314 are cycled until a match is obtained with binary counter 316. Finally, the pulse applied through AND gate 147 to SPC lead 280 is also passed to the CLEAR input of IL flip-flop 404, clearing the flip-flop. Thus, the station polling code that is generated corresponds to the next station as determined by last poll store binary counter 316.

It is noted that in the event that main binary counter 314 is completely recycled in the poll state, all-"0" detector 326 energizes ALL-"0" lead 333, poll flip-flop 144 enables lead POLL, and counter 314 and counter 316 match to energize MATCH lead 266. AND gate 405 is, therefore, enabled to pass the high speed clock pulse on lead 343 to OR gate 120. Thus, after a full poll cycle, the skip table is again transferred to register 315.

Although a specific embodiment of this invention has been shown and described, it will be understood that various modifications may be made without departing from the spirit of this invention and within the scope of the appended claims.

What is claimed is:

1. In a party line data transmission system, a line controller including means effective during a polling state for generating and transmitting sequential polling codes and means effective during a test poll state for generating and transmitting sequential test poll codes, and a plurality of party line stations, each of said stations including a data message transmitter and code detection means responsive to an individual one of said polling codes for starting the transmitter thereat and responsive to an individual one of said poll codes for precluding the starting of said transmitter and for returning answerback data codes indicating the condition of the station, said line controller further including means effective during said polling state and operated in response to improper data message transmission for placing said line controller in said test poll state.

2. In a party line transmission system, in accordance with claim 1, wherein said line controller also includes means effective during said test poll state and operated in response to proper data code answerback for placing said line controller in said polling state.

3. In a party line transmission system, in accordance with claim 1, wherein said line controller also includes means effective when said line controller is placed in said test poll state for recording the previously transmitted polling code to identify the party line station providing improper data message transmission.

4. In a party line transmission system, in accordance with claim 3, wherein said improper data message transmission comprises a message interruption.

5. In a party line transmission system, in accordance with claim 3, wherein said improper data message transmission comprises a non-designated data signal.

6. In a party line transmission system, in accordance with claim 3, wherein said recording means also records an indication of said improper data message transmission.

7. In a party line transmission system, in accordance with claim 3, wherein said recording means is maintained effective during said poll state, to record said test poll codes.

8. In a party line transmission system, in accordance with claim 7, wherein said recording means records said answerback data codes during said test poll state.

9. In a party line data transmission system, a line controller including means effective during a polling state for generating and transmitting sequental polling codes and means effective during a test poll state for generating and transmitting sequential test poll codes, and a plurality of party line stations, each of said stations including a data message transmiter and code detection means responsive to an individual one of said polling codes for starting the transmitter thereat when a message is available and for returning answerback data codes indicating the condition of the station when a message is unavailable and responsive to an individual one of said test poll codes for precluding the starting of said transmitter and for enabling the returning of said answerback data codes, said line controller further including means effective during said test poll state and operated in response to proper data code answerback for placing said line controller in said polling state.

10. A party line data transmission system including a line controller having means effective during a polling state for transmitting polling codes to sequentially start line station data message transmitters, characterized in that said line controller further includes means effective during a test poll state for transmitting test poll codes to sequentially poll line stations for conditions thereat, means effective in said test poll state and responsive to predetermined conditions at said test poll station for placing said line cotnroller in said polling state and means effective in said polling state and responsive to improper data message transmission from said station trnasmitter for placing said line controller in said test poll state.

References Cited

UNITED STATES PATENTS

| | | | |
|---|---|---|---|
| 2,974,187 | 3/1961 | Barrett et al. | |
| 3,046,525 | 7/1962 | Deming et al. | |
| 3,427,587 | 2/1969 | Carlson et al. | 340—147 |
| 3,427,590 | 2/1969 | Mauzey et al. | 340—147 |

DONALD J. YUSKO, Primary Examiner